US010783543B1

(12) United States Patent
Mantyla et al.

(10) Patent No.: US 10,783,543 B1
(45) Date of Patent: Sep. 22, 2020

(54) METHOD, SYSTEM AND COMPUTER PROGRAM PRODUCT FOR ADMINISTERING DISCOUNT REWARDS PROGRAMS

(71) Applicants: Kane Mantyla, Richmond, CA (US); Tabitha Kerkove, St. Augustine, FL (US)

(72) Inventors: Kane Mantyla, Richmond, CA (US); Tabitha Kerkove, St. Augustine, FL (US)

( * ) Notice: Subject to any disclaimer, the term of this patent is extended or adjusted under 35 U.S.C. 154(b) by 518 days.

(21) Appl. No.: 15/344,456

(22) Filed: Nov. 4, 2016

(51) Int. Cl.
*G06Q 30/02* (2012.01)
*G06Q 30/04* (2012.01)
*G06F 3/0481* (2013.01)

(52) U.S. Cl.
CPC ....... *G06Q 30/0226* (2013.01); *G06F 3/0481* (2013.01); *G06Q 30/04* (2013.01)

(58) Field of Classification Search
None
See application file for complete search history.

(56) References Cited

U.S. PATENT DOCUMENTS

| | | | | |
|---|---|---|---|---|
| 5,612,868 A | * | 3/1997 | Off | G06Q 20/20 705/14.25 |
| 5,832,457 A | * | 11/1998 | O'Brien | G06Q 20/20 705/14.13 |
| 5,970,470 A | * | 10/1999 | Walker | G06Q 20/201 705/14.27 |
| 6,334,108 B1 | * | 12/2001 | Deaton | G06Q 20/045 705/14.13 |
| 6,684,195 B1 | * | 1/2004 | Deaton | G06Q 20/387 705/14.13 |
| 7,343,319 B1 | * | 3/2008 | Walker | G06Q 20/202 705/21 |
| 8,458,017 B2 | * | 6/2013 | Shin | G06Q 20/32 705/14.1 |
| 8,533,034 B2 | | 9/2013 | Blicker | |
| 8,676,642 B1 | * | 3/2014 | Sheley | G06Q 30/0234 705/14.24 |
| 2004/0117261 A1 | * | 6/2004 | Walker | G06Q 20/105 705/14.13 |
| 2006/0206385 A1 | * | 9/2006 | Walker | G06Q 30/02 705/21 |

(Continued)

*Primary Examiner* — David J Stoltenberg
(74) *Attorney, Agent, or Firm* — Kanika Radhakrishnan; Evergreen Valley Law Group

(57) ABSTRACT

A method, system and computer program product for administering a discount rewards program to customers of merchant establishment is disclosed. A customer is assigned a discount level as part of enrollment into the discount rewards program and a bill amount is discounted based on the assigned discount level. For a next purchase transaction at the merchant establishment, it is determined whether the next purchase transaction is within a predefined time interval from the purchase transaction associated with the customer enrollment. A current discount level is determined by incrementing or decrementing the discount level based on the determination of whether the next purchase transaction is within the predefined time interval or not. A bill amount is discounted based on the current discount level and the discounted bill amount is provided to the customer to reward the customer.

28 Claims, 11 Drawing Sheets

(56) References Cited

U.S. PATENT DOCUMENTS

| | | | |
|---|---|---|---|
| 2006/0206386 A1* | 9/2006 | Walker | G06Q 30/0222 705/21 |
| 2006/0212358 A1* | 9/2006 | Walker | G06Q 20/387 705/21 |
| 2006/0259364 A1* | 11/2006 | Strock | G06Q 30/0216 705/14.15 |
| 2007/0130016 A1* | 6/2007 | Walker | G06Q 20/105 705/14.35 |
| 2007/0156509 A1* | 7/2007 | Jung | G06Q 30/0209 705/14.12 |
| 2008/0052169 A1* | 2/2008 | O'Shea | G06Q 20/10 705/14.17 |
| 2008/0097857 A1* | 4/2008 | Walker | G06Q 30/02 705/14.27 |
| 2009/0018919 A1* | 1/2009 | Walker | G06Q 20/105 705/14.27 |
| 2009/0281888 A1 | 11/2009 | Zai et al. | |
| 2010/0070359 A1* | 3/2010 | Heasley | G06Q 20/10 705/14.17 |
| 2010/0106587 A1* | 4/2010 | Walker | G06Q 20/202 705/14.23 |
| 2010/0280882 A1* | 11/2010 | Faith | G06Q 10/06375 705/7.37 |
| 2011/0153397 A1 | 6/2011 | Wagenheim | |
| 2011/0153400 A1* | 6/2011 | Averbuch | G06Q 30/02 705/14.25 |
| 2011/0153407 A1* | 6/2011 | Walker | G06Q 20/105 705/14.35 |
| 2011/0246272 A1* | 10/2011 | Joa | G06Q 30/0215 705/14.17 |
| 2011/0264490 A1* | 10/2011 | Durvasula | G06Q 30/0207 705/14.1 |
| 2012/0084128 A1 | 4/2012 | Murphy et al. | |
| 2012/0203603 A1* | 8/2012 | Mesaros | G06Q 30/0222 705/14.16 |
| 2012/0209684 A1* | 8/2012 | Postrel | G06Q 40/04 705/14.23 |
| 2012/0253977 A1* | 10/2012 | Mesaros | G06Q 30/0605 705/26.41 |
| 2012/0323657 A1* | 12/2012 | Tiku | G06Q 30/0207 705/14.17 |
| 2012/0323662 A1* | 12/2012 | Otto | G06Q 40/12 705/14.25 |
| 2012/0330744 A1* | 12/2012 | Aissa | G06Q 30/0238 705/14.38 |
| 2013/0006875 A1* | 1/2013 | Sanders | G06Q 30/02 705/304 |
| 2013/0030900 A1* | 1/2013 | Nicholson | G06Q 20/18 705/14.23 |
| 2013/0060621 A1* | 3/2013 | Walker | G06Q 20/202 705/14.23 |
| 2013/0110597 A1* | 5/2013 | Blair | G06Q 20/387 705/14.16 |
| 2013/0166362 A1* | 6/2013 | Sutton | G06Q 30/0605 705/14.13 |
| 2013/0185129 A1* | 7/2013 | Berman | G06Q 30/0207 705/14.25 |
| 2013/0332252 A1 | 12/2013 | Klein et al. | |
| 2014/0052533 A1* | 2/2014 | Mesaros | G06Q 30/0213 705/14.54 |
| 2014/0180803 A1 | 6/2014 | Sedighian | |
| 2014/0236703 A1* | 8/2014 | Nordstrand | G06Q 30/0222 705/14.38 |
| 2014/0330635 A1* | 11/2014 | Moran | G06T 3/0006 705/14.43 |
| 2014/0358664 A1* | 12/2014 | Wheeler | G06Q 30/0226 705/14.33 |
| 2015/0019317 A1* | 1/2015 | Mitchell | G06Q 30/0226 705/14.27 |
| 2015/0149277 A1* | 5/2015 | Mankoff | G06Q 30/0246 705/14.45 |
| 2015/0310477 A1* | 10/2015 | Mankoff | G06Q 30/0226 705/14.27 |
| 2016/0148244 A1* | 5/2016 | Nordstrand | G06Q 30/0238 705/14.38 |
| 2016/0275543 A1* | 9/2016 | Chiang | G06Q 30/0223 |
| 2016/0275558 A1* | 9/2016 | Tiku | G06Q 30/0207 |
| 2016/0283954 A1* | 9/2016 | Lei | G06Q 30/0211 |
| 2016/0343017 A1* | 11/2016 | Carlson | G06Q 30/0244 |
| 2017/0053305 A1* | 2/2017 | Montero | G06Q 30/0244 |

\* cited by examiner

METHOD, SYSTEM AND COMPUTER PROGRAM PRODUCT FOR ADMINISTERING DISCOUNT REWARDS PROGRAMS

TECHNICAL FIELD

The present application generally relates to rewarding customers through loyalty programs, and more particularly to methods, systems and computer program products for administering discount rewards programs to customers of merchant establishments.

BACKGROUND

Businesses typically use loyalty reward programs to retain existing customers and to gain new customers. As a part of the loyalty reward programs, the existing or potential customers may be offered incentives such as discounts based on volume, frequency and/or value of purchase transactions. For example, loyalty reward programs such as Airline frequent flyer clubs allow their customers to accumulate miles and permit redemption of the miles for a fully discounted (i.e. free) trip. As such, the loyalty reward programs are also referred to as discount rewards programs.

Some existing loyalty reward programs base rewards on purchases or generated point values. For example, when a customer makes a purchase of goods or services from a particular merchant, reward points may be earned which may be redeemed for making further purchases of goods or services. In such point based loyalty reward programs, points are usually not earned or spent in a 1:1 ratio, thereby leading to a general customer perception of having to spend twice or more to receive a reward. Further, as the customers develop the perception of being rewarded only a fraction of what is being spent, a loyalty attachment value towards the particular merchant declines thereby leading to a loss of customers. Furthermore, as points are earned slowly for goods or services that are used less frequently, such point based loyalty reward programs fail to achieve a minimum loyalty attachment required to compel the customers to repeat purchases.

Further, some service-based businesses provide membership based loyalty reward programs where customers who enroll as members are offered larger discounts than non-member customers. Such membership based loyalty reward programs usually require the member customers to pay a membership fee in order to avail discounts on services offered by a particular merchant. Such membership fee is usually payable even if the member customer does not avail the services for a month or for a number of successive months. A member customer, whose discounts are marginal, may see the savings from the membership decline after a month or after a number of months of non-use resulting in a cancellation of membership. The cancellation of membership may usually result in a loss of the member customer and thereby reduced revenue for the particular merchant.

Alternatively, some business may offer their services at a big discount such as a 50% discount on services initially in order to get first time customers to visit the business and may provide the customers with high-quality services in order to attract a return visit at full price. However, observed customer behavior shows that when a customer receives a discount on an item, the customer often will not pay full price for the item later. As the customer may not return at full price to earn future rewards, the business may fail to retain the customer.

In view of the above, there is a need for a discount rewards program that can compel or entice the customer to return at a discount rate. Further the discount rewards program should retain the customer irrespective of a frequency and cost of purchases made by the customer.

SUMMARY

Various embodiments of the present disclosure provide a method, system and a computer program product for administering discount rewards program to customers of merchant establishments.

In an embodiment, a computer-implemented method for administering a discount rewards program to customers of a merchant establishment is disclosed. For a customer engaged in a purchase transaction at a merchant establishment, the method includes facilitating, by a processor, enrollment of the customer of the merchant establishment into a discount rewards program. The method includes discounting, by the processor, a bill amount associated with the purchase transaction based on a discount level assigned to the customer as a part of the customer enrollment into the discount rewards program. The discount level is one of a plurality of discount levels associated with the discount rewards program. Each discount level from the plurality of discount levels is associated with a respective predefined discount factor and the predefined discount factor is configured to increase with increase in discount level up to a maximum discount level from among the plurality of discount levels. For a next purchase transaction at the merchant establishment, the method includes determining, by the processor, if the next purchase transaction is within a predefined time interval from the purchase transaction associated with the customer enrollment. The method further includes determining, by the processor, a current discount level for the next purchase transaction by (1) incrementing the discount level to a next discount level from among the plurality of discount levels if the next purchase transaction is within the predefined time interval, wherein the discount level is retained if the discount level is at the maximum discount level, or (2) decrementing the discount level to a lower discount level from among the plurality of discount levels if the next purchase transaction is beyond the predefined time interval, wherein the discount level is retained if the discount level is at a minimum discount level. Further, the method includes discounting, by the processor, a bill amount associated with the next purchase transaction based on the current discount level. The discounted bill amount is provided to the customer to reward the customer.

In at least one example embodiment, method includes facilitating a provisioning of a first input related to at least one of the predefined time interval, a discount factor interval corresponding to an interval between predefined discount factors associated with the plurality of discount levels and a maximum number of discount levels. Further, the method includes facilitating, by the processor, a provisioning of a second input related to a number of reminder notifications. Each reminder notification reminds the customer of a discount to be availed for a next purchase at the merchant establishment and a time left for the predefined time interval to lapse. The method further includes providing, by the processor, one or more reminder notifications to the customer based on the second input. In some embodiments, the first input and the second input are provided by a representative associated with the merchant establishment.

In an embodiment, a system for administering a discount rewards program to customers of merchant establishments is disclosed. For a customer engaged in a purchase transaction at a merchant establishment, the system includes a display module configured to display a first UI capable of facilitating enrollment of the customer of the merchant establishment into a discount rewards program. The system also includes at least one processor and a memory having stored therein machine executable instructions, that when executed by the at least one processor, cause the system to discount a bill amount associated with the purchase transaction based on a discount level assigned to the customer as a part of the customer enrollment into the discount rewards program. The discount level is one of a plurality of discount levels associated with the discount rewards program. Each discount level from the plurality of discount levels is associated with a respective predefined discount factor and the predefined discount factor is configured to increase with increase in the discount level up to a maximum discount level from among the plurality of discount levels. For a next purchase transaction at the merchant establishment, the system is caused to determine if the next purchase transaction is within a predefined time interval from the purchase transaction associated with the customer enrollment. The system is further caused to determine a current discount level for the next purchase transaction by (1) incrementing the discount level to a next discount level from among the plurality of discount levels if the next purchase transaction is within the predefined time interval, wherein the discount level is retained if the discount level is at the maximum discount level, or (2) decrementing the discount level to a lower discount level from among the plurality of discount levels if the next purchase transaction is beyond the predefined time interval, wherein the discount level is retained if the discount level is at a minimum discount level. Further, the system is caused to discount a bill amount associated with the next purchase transaction based on the current discount level. The discounted bill amount is provided to the customer to reward the customer.

In an embodiment, a computer program product for administering a discount rewards program to customers of a merchant establishment is disclosed. The computer program product includes at least one computer-readable storage medium, the computer-readable storage medium comprising a set of instructions, which, when executed by one or more processors, cause an electronic device to at least perform, for a customer engaged in a purchase transaction at a merchant establishment, facilitate enrollment of the customer of the merchant establishment into a discount rewards program. The electronic device is caused to discount a bill amount associated with the purchase transaction based on a discount level assigned to the customer as a part of the customer enrollment into the discount rewards program. The discount level is one of a plurality of discount levels associated with the discount rewards program. Each discount level from the plurality of discount levels is associated with a respective predefined discount factor, and the predefined discount factor is configured to increase with increase in discount level up to a maximum discount level from among the plurality of discount levels. For a next purchase transaction at the merchant establishment, the electronic device is caused to determine if the next purchase transaction is within a predefined time interval from the purchase transaction associated with the customer enrollment. Further, the electronic device is caused to determine a current discount level for the next purchase transaction by (1) incrementing the discount level to a next discount level from among the plurality of discount levels if the next purchase transaction is within the predefined time interval, wherein the discount level is retained if the discount level is at the maximum discount level, or (2) decrementing the discount level to a lower discount level from among the plurality of discount levels if the next purchase transaction is beyond the predefined time interval, wherein the discount level is retained if the discount level is at a minimum discount level. Further, the electronic device is caused to discount a bill amount associated with the next purchase transaction based on the current discount level. The discounted bill amount is provided to the customer to reward the customer.

Other aspects and example embodiments are provided in the drawings and the detailed description that follows.

BRIEF DESCRIPTION OF THE FIGURES

For a more complete understanding of example embodiments of the present technology, reference is now made to the following descriptions taken in connection with the accompanying drawings in which.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Figure 1:
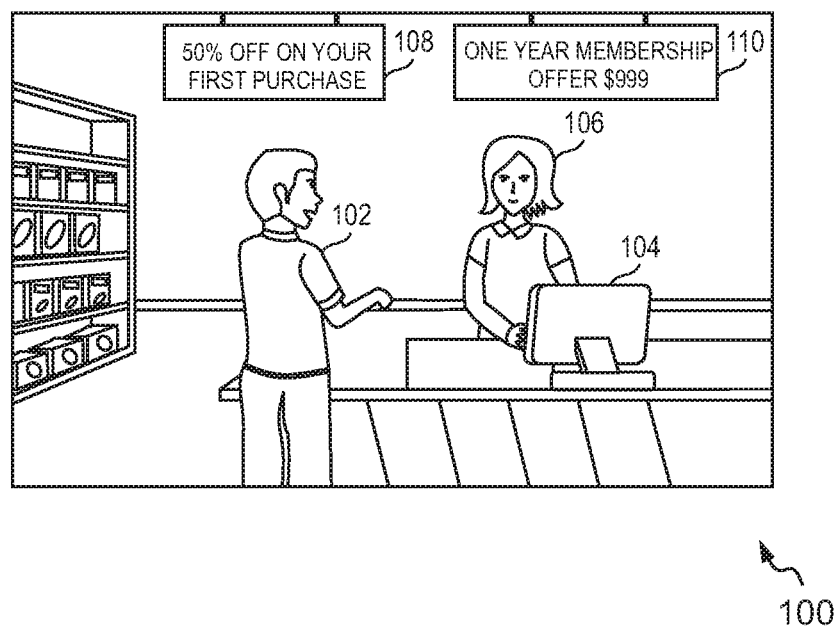
FIG. 1 illustrates an example representation of a customer engaged in a purchase transaction at a merchant establishment, in accordance with an example scenario.

FIG. 1 is an example representation 100 showing a customer 102 engaged in a purchase transaction at a merchant establishment, in accordance with an example scenario. The merchant establishment may correspond to any enterprise associated with selling products and/or services to existing and potential customers. For example, the merchant establishment may correspond to a retail outlet, a hair salon, a dental clinic, a Spa and massage treatment center etc. It is noted that the merchant establishment is depicted to be a physical store for illustration purposes. In some example scenarios, customers, such as the customer 102, may engage in purchase transactions with the merchant establishment, online, for example via a web portal or a website associated with the merchant establishment. For example, an online merchant establishment may correspond to air travel reservation portal.

In an example scenario, a customer, such as the customer 102, may visit the merchant establishment for purchasing a product or availing a service. The purchase may be processed via a merchant terminal 104 placed within the merchant establishment. The merchant terminal 104 may correspond to a point of sale (POS) terminal. The POS terminal may be embodied as a desktop computer or a personal digital assistant (PDA). The POS terminal may be connected to other payment processing networks (not shown in FIG. 1) using wired and/or wireless networks, for processing the purchase made by the customer 102. In FIG. 1, a representative 106 of the merchant establishment is depicted to be assisting the customer 102 in processing the purchase transaction.

In many example scenarios, the merchant establishment may put up posters (or online banners) offering discount rewards to the visitors to entice visitors to make purchase transactions. For example, in FIG. 1, the merchant establishment is depicted to have put up an advertisement poster 108 for 50% discount on first purchase at the merchant establishment. Similarly, another advertisement poster 110 may display an annual membership offer with associated rewards to visitors at the merchant establishment. Some notifications may also offer rewards for customer referral.

Discount rewards, such as the 50% discount for the first time customer may fail to attract the customer 102 to make another purchase at a full price for a subsequent purchase, as a psychology of pricing shows that when the customer 102 receives a discount on an item or a service, the customer 102 often may not pay full price for the item or service later.

Membership based discounts, where the customer 102 pays a membership fee to the merchant in order to avail discounts on the products and/or services offered by the merchant, may also fail to retain the customer 102. As the membership fees are usually payable even if the customer 102 may not avail the services in a month or in a number of successive months, the discount may turn out to be marginal and the savings from the membership may decline after a month or after a number of months of non-use of the services. This may in turn lead to cancellation of the membership by the customer 102, and a loss of customer for the merchant.

Various embodiments of the present technology provide a method, system and computer program product that are capable of overcoming these and other obstacles and providing additional benefits. More specifically, various embodiments of the present technology disclose a time-based loyalty program (referred to herein as a discount rewards program) that uses an increasing and decreasing discount reward schedule based on regular interval visits made or missed, respectively, to compel customers to repeat purchases with the same merchant within set time intervals. An example system for administering discount rewards program to customers of a merchant establishment is explained with reference to FIG. 2.

Figure 2:
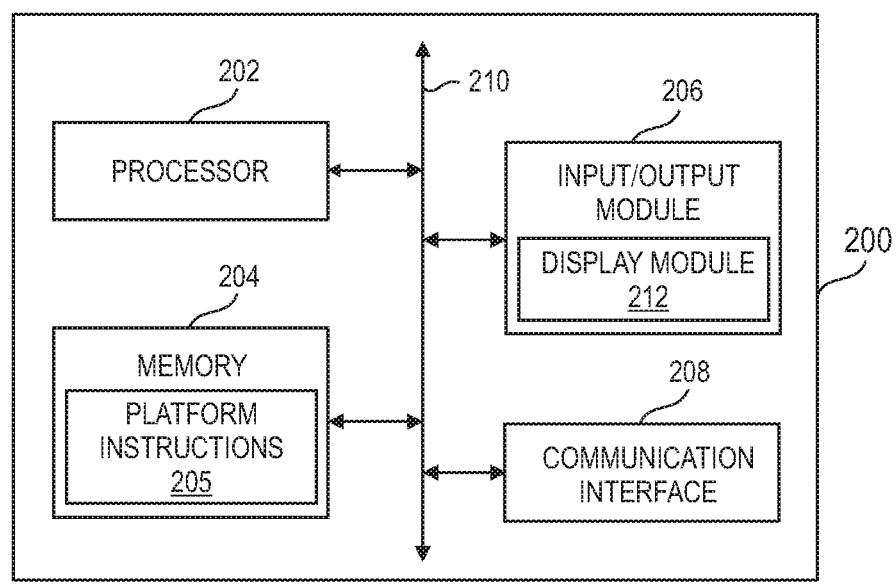
FIG. 2 is a block diagram of a system configured to facilitate an administering of a discount rewards program to customers of a merchant establishment, in accordance with an example embodiment.

FIG. 2 is a block diagram of a system 200 configured to facilitate an administering of a discount rewards program to customers of a merchant establishment, in accordance with an example embodiment. The system 200 includes at least one processor such as a processor 202, at least one memory such as a memory 204, an input/output module 206 and a communication interface 208. In at least one example embodiment, the system 200 is included within a merchant terminal 104, such as the POS terminal explained with reference to FIG. 1. In some embodiments, the system 200 may embody the merchant terminal 104. In some embodiments, the system 200 may be included within (or may be communicably associated with) a web server hosting a website or a web portal associated with a merchant establishment and facilitate an administering of a discount rewards program to online customers of the merchant establishment.

Although the system 200 is depicted to include only one processor 202, the system 200 may include more number of processors therein. In an embodiment, memory 204 is capable of storing platform instructions 205, where platform instructions 205 are machine executable instructions associated with a discount rewards program application configured to facilitate an administering of the discount rewards program to a plurality of customers. Further, the processor 202 is capable of executing the stored platform instructions 205. In an embodiment, the processor 202 may be embodied as a multi-core processor, a single core processor, or a combination of one or more multi-core processors and one or more single core processors. For example, the processor 202 may be embodied as one or more of various processing devices, such as a coprocessor, a microprocessor, a controller, a digital signal processor (DSP), a processing circuitry with or without an accompanying DSP, or various other processing devices including integrated circuits such as, for example, an application specific integrated circuit (ASIC), a field programmable gate array (FPGA), a microcontroller unit (MCU), a hardware accelerator, a special-purpose computer chip, and the like. In an embodiment, the processor 202 may be configured to execute hard-coded functionality.

In an embodiment, the processor 202 may be embodied as an executor of software instructions, wherein the software instructions may specifically configure the processor 202 to perform algorithms and/or operations described herein when the software instructions are executed.

The memory 204 may be embodied as one or more volatile memory devices, one or more non-volatile memory devices, and/or a combination of one or more volatile memory devices and non-volatile memory devices. For example, the memory 204 may be embodied as magnetic storage devices (such as hard disk drives, floppy disks, magnetic tapes, etc.), optical magnetic storage devices (e.g., magneto-optical disks), CD-ROM (compact disc read only memory), CD-R (compact disc recordable), CD-R/W (compact disc rewritable), DVD (Digital Versatile Disc), BD (BLU-RAY® Disc), and semiconductor memories (such as mask ROM, PROM (programmable ROM), EPROM (erasable PROM), flash ROM, RAM (random access memory), etc.).

The input/output module 206 (hereinafter referred to as I/O module 206) is configured to facilitate provisioning of an output and/or receiving an input. The I/O module 206 is configured to be in communication with processor 202 and memory 204. Examples of the I/O module 206 include, but are not limited to, an input interface and/or an output interface. Some examples of the input interface may include, but are not limited to, a keyboard, a mouse, a joystick, a keypad, a touch screen, soft keys, a microphone, and the like. Some examples of the output interface may include, but are not limited to, a microphone, a speaker, a ringer, a vibrator, and the like. In at least one example embodiment, the output interface is configured to include a display module, such as a display module 212 depicted as a part of the I/O module 206 in FIG. 2. In at least one example embodiment, the display module 212 includes a display such as for example, a light emitting diode display, a thin-film transistor (TFT) display, a liquid crystal display, an active-matrix organic light-emitting diode (AMOLED) display, and the like.

In an example embodiment, the processor 202 may include I/O circuitry configured to control at least some functions of one or more elements of I/O module 206, such as, for example, the display module 212, a speaker, a microphone, a display, and/or the like. The processor 202 and/or the I/O circuitry may be configured to control one or more functions of the one or more elements of the I/O module 206 through computer program instructions, for example, software and/or firmware, stored on a memory, for example, the memory 204, and/or the like, accessible to the processor 202.

In an embodiment, the display module 212 may be configured to display a plurality of user interfaces (UIs) (as will be explained later with reference to FIGS. 3, 4A-4C, and 5). The displayed UIs may be associated with content configured to enable a user of the system 200 to enroll visitors into the discount rewards program and/or provide discounts on purchases made by the customers. In an example embodiment, the user of the system 200 may be a representative associated with the merchant establishment, such as the representative 106 depicted in FIG. 1. The representative may be an agent working for the merchant establishment or the merchant himself. As explained above, the I/O module 206 may be integrated with mechanisms configured to receive inputs from the user of system 200.

The communication interface 208 enables the system 200 to communicate with other entities over various types of networks, such as for example, wired or wireless networks or combinations of wired and wireless networks, such as for example, the Internet. In at least on example embodiment, the communication interface 208 may facilitate communication between the system 200 and one or more payment processing networks (i.e. payment gateways, credit agencies etc.). To that effect, the communication interface 208 may include a transceiver circuitry configured to enable transmission and reception of data signals over the various types of communication networks. In some embodiments, the communication interface 208 may include appropriate data compression and encoding mechanisms for securely transmitting and receiving data related to customer purchase transactions.

The transceiver circuitry of the communication interface 208 may also facilitate reception of an instance of discount rewards program application from a remote server hosting the discount rewards program application. A remote server hosting the discount rewards program application and facilitating an administering of the discount rewards program to customers of a merchant establishment is explained later with reference to FIG. 9. The communication interface 208 may include relevant application programming interfaces (APIs) to facilitate reception of the application from an application store hosted on the remote server. The discount rewards program application may then be stored by the communication interface 208 in the memory 204. The processor 202 may be configured to execute the discount rewards program application stored in the memory 204 in accordance with the platform instructions 205, to facilitate administering of the discount rewards program to customers of the merchant establishment.

In an embodiment, various components of system 200, such as the processor 202, the memory 204, the I/O module 206 and the communication interface 208 may be configured to communicate with each other via or through a centralized circuit system 210. The centralized circuit system 210 may be various devices configured to, among other things, provide or enable communication between the components (202-208) of the system 200. In certain embodiments, the centralized circuit system 210 may be a central printed circuit board (PCB) such as a motherboard, a main board, a system board, or a logic board. The centralized circuit system 210 may also, or alternatively, include other printed circuit assemblies (PCAs) or communication channel media.

The system 200 as illustrated and hereinafter described is merely illustrative of a system that could benefit from embodiments of the invention and, therefore, should not be taken to limit the scope of the invention. It may be noted that the system 200 may include fewer or more components than those depicted in FIG. 2. As explained above, the system 200 may be included within or embody an electronic device. Moreover, the system 200 may be implemented as a centralized system, or, alternatively, the various components of system 200 may be deployed in a distributed manner while being operatively coupled to each other.

The system 200 is configured to facilitate an administering of a discount rewards program to a plurality of customers of an enterprise. The term 'discount rewards program' as used herein and as will be explained in detail hereinafter, refers to a time-based loyalty program that uses an increasing and decreasing discount reward schedule based on regular interval visits made or missed, respectively, to compel customers to repeat purchases with the same merchant within set time intervals. More specifically, the reward schedule offers a higher discount as the customer increases the frequency of purchases and a lesser discount if the customer decreases the frequency of purchases. The discount rewards program may be administered to customers of a merchant establishment by the system 200 included with a POS terminal, such as the merchant terminal explained with reference to FIG. 1. For online merchant establishments, the discount rewards program may be administered by the system 200 deployed in a web server hosting the website or the web portal associated with the respective merchants.

In an embodiment, the system 200 may be configured to facilitate administering of the discount rewards program based on the discount rewards program application stored in the memory 204. The discount rewards program application may enable a representative of the merchant establishment (hereinafter referred to as 'user' or the 'user of the system 200' for ease of description) to preset a number of discount levels and a discount factor for each discount level. For example, the user may preset a maximum number of discount levels applicable to a customer. For example, a customer may be provided with a maximum of two, five or ten discount levels. The user may also preset a discount factor interval, which in turn sets or predefines a discount factor associated with each discount level. For example, the discount factor interval may be set to 2.5%, 5% or 10%. In an illustrative example, if the maximum discount level applicable to a customer is preset to five and the discount factor interval is preset to 5%, then the predefined discount factor applicable for the five discount levels may be 5%, 10%, 15%, 20%, and 25%, respectively. It is noted that in some embodiments, instead of presetting the discount factor interval, the user may select discount factor values (for example, assign arbitrary values) for each discount level. For example, the user may preset the maximum discount level to five and further select the five discount levels as 10%, 15%, 25%, 35% and 50%.

A customer may be provided a discount on a purchase transaction based on a current discount level applicable to the customer. The current discount level applicable to the customer may be varied based on a time interval lapsed between successive purchases. For example, the customer may be provided with an initial or a first discount based on a selected first discount level as the current discount level for a first purchase. Further, for a subsequent purchase made within a predefined time interval, the first discount level may be incremented to a consecutive higher discount level (for example, a second discount level), and a bill amount corresponding to the subsequent purchase may be discounted by the predefined discount factor associated with the second discount level. However, if the customer misses to make the subsequent purchase within the predefined time interval, the discount level applicable to the customer may be decremented to a consecutive lower discount level. As a result, the customer may be rewarded with a lesser discount for a subsequent purchase due to the decremented current discount level. To summarize, if a time interval between successive purchases exceeds a predetermined threshold (for example, a month, a quarter year, etc.) the discount available to the customer may decrease thereby compelling the customer to repeat purchases before lapse of the time interval (referred to herein to as the predefined time interval). The predefined time interval may be reset after each subsequent purchase or after expiry of the predefined time interval. The discount factor interval, the plurality of discount levels and the predefined time interval may be optimized for the merchant establishment based on a type of products and/or services offered by the merchant establishment or a type of industry associated with the merchant establishment (for example, health care industry, hospitality industry etc.). Predefined optimum values, as per industry standard settings, for the discount factor interval, the plurality of discount levels and the predefined time interval may be presented to the user of the system 200 to enable a high loyalty attachment from the customer towards the merchant establishment.

In an embodiment, a discount level may be incremented up to a preset maximum discount level and may be decremented up to a preset minimum discount level. In case, a discount level associated with the customer is at the minimum discount level, and the customer misses to make the subsequent purchase within the predefined time interval then the discount level may be retained at the minimum discount level. Further, in case a discount level associated with the customer is at the maximum discount level, and the customer makes the subsequent purchase during the predefined time interval the discount level may be retained at the maximum discount level. As a result, the merchant may place a cap on a minimum discount and a maximum discount to be provided to the customer.

Further, one or more reminder notifications may be communicated to the customer of availability of a discount corresponding to a discount level applicable to the customer. The one or more reminder notifications may be date reminders to compel the customer to repeat a purchase or make the subsequent purchase before lapse of the predefined time interval to receive the discount corresponding to the applicable discount level. The reminder notifications may improve a working efficiency of the discount rewards program. An optimized number of reminder notifications may be communicated to the customer during the predefined time interval to improve the loyalty attachment value of the customer.

The discount rewards program (as outlined above) may be administered by the user using the system 200. The administering of the discount rewards program is explained hereinafter with reference to one customer of a merchant establishment. However, it is understood that the system 200 may be caused to facilitate administering of the discount rewards program to a plurality of customers of several merchant establishments in a similar manner.

In at least one example embodiment, the processor 202 may cause the system 200 to facilitate enrollment of the customer of the merchant establishment into the discount rewards program. In an illustrative example, a customer having chosen a product to be purchased, or a service to be availed, may visit the checkout counter of a merchant establishment (or access an check out web page if the merchant establishment is an online portal) to complete the purchase transaction. The user of the system 200 may request the customer to enroll himself in the discount rewards program prior to completing the purchase transaction. In at least one example embodiment, the user may explain the benefits of enrolling into the discount rewards program to the customer. If the customer agrees to enroll, the system 200 may be caused to display a first user interface (UI) to facilitate enrollment of the customer in the discount rewards program. An example first UI displayed by the display module 212 is depicted in FIG. 3.

Figure 3:
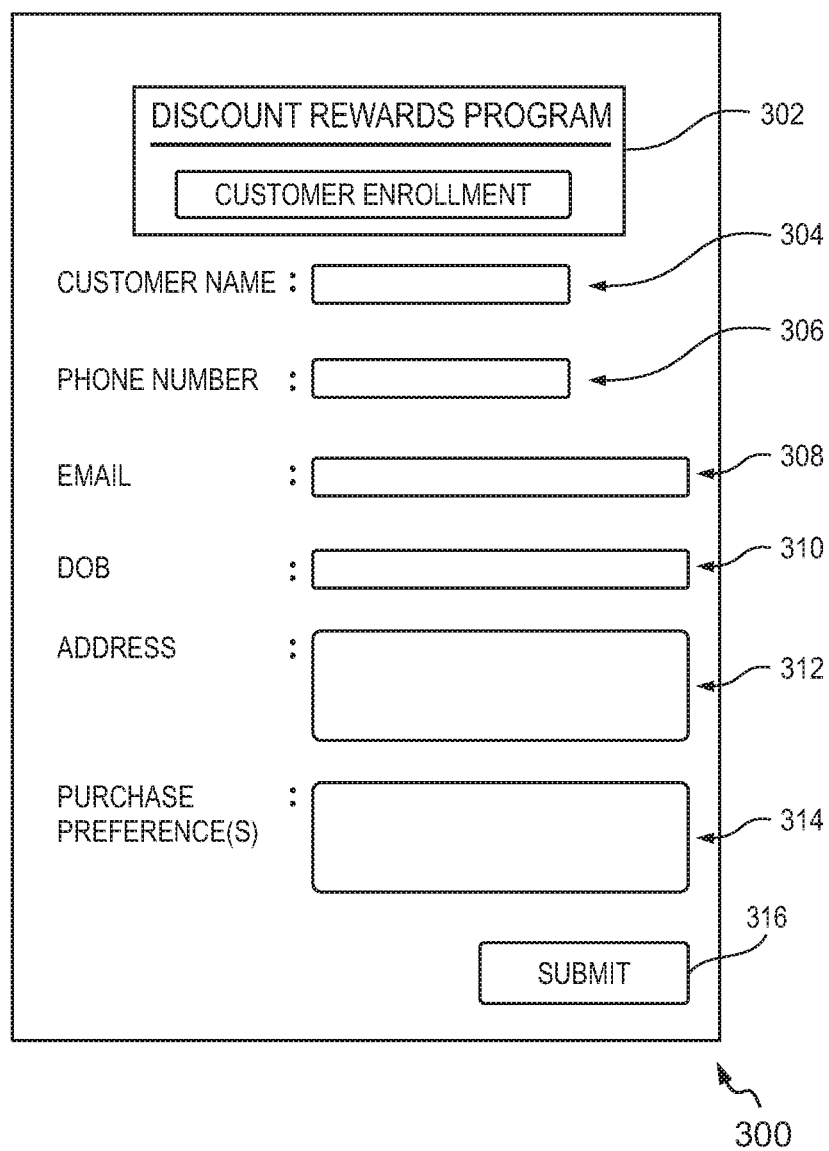
FIG. 3 shows a first user interface (UI) displayed by a display module of the system of FIG. 2 to facilitate enrollment of a customer in the discount rewards program, in accordance with an example embodiment.

Referring now to FIG. 3, a first UI 300 displayed by the display module 212 of the system 200 to facilitate enrollment of a customer in the discount rewards program is shown, in accordance with an example embodiment. The first UI 300 depicts a label 302 showing text portions "Discount Rewards Program" and "Customer Enrollment" indicating that the first UI 300 (or the webpage) corresponds to a membership form in which details of the customer may be entered by the user of the system 200 for enrolling the customer into the discount rewards program. Accordingly, the first UI 300 is depicted to display several form fields related to details to be received from the customer to enroll the customer in the discount rewards program. For example, the first UI 300 is depicted to display form fields 304, 306, 308, 310, 312 and 314 corresponding to form field titles: Customer Name, Phone number, Email, Date of Birth (or DOB), Address and Purchase Preferences (for example, choice of service, email or SMS reminder notifications etc.), respectively.

Each of the form fields 304-314 is capable of receiving text input corresponding to associated form field title. The customer may provision the information to the user of the system 200 in a verbal manner or a textual form. Upon entering the relevant information in the form fields 304-314, the user may click (or provide a touch input) on the 'Submit' button 316 displayed on the first UI 300.

In at least one example embodiment, the submission of the information entered in the form fields 304-314 may cause enrollment of the customer in the discount rewards program. It is noted that enrollment in the discount rewards program as referred to herein implies inclusion of the customer in a select club of members, who are treated preferentially as compared to the regular non-member customers. The preferential treatment may be realized in form of discounts on subsequent purchase transactions at the merchant establishment.

Further, in at least one example embodiment, information related to customer enrollment may be stored in the memory 204. In an example embodiment, a membership card may be provided to the customer and the details of the customer may be added into the membership card when swiped over a card reader at the merchant establishment. The membership card may be associated with a card number unique to the customer.

Upon enrollment of the customer into the discount rewards program, a discount level may be assigned by the system 200 to the customer. In an example embodiment, a number of stars corresponding to the discount level may be reflected on the membership card provided to the customer. The card number or the phone number may be used by the system 200 to check for a discount level applicable to the customer for future purchase transactions. Further, the system 200 may discount a bill amount for an ongoing purchase transaction at the time of enrollment, where the bill amount is discounted based on the discount level assigned to the customer as a part of the customer enrollment.

The discount level assigned to the customer at the time of customer enrollment may be one of a plurality of discount levels associated with the discount rewards program. Each discount level from the plurality of discount levels may be associated with a respective predefined discount factor. The predefined discount factor associated with various discount levels are configured to increase with increase in the discount level up to a maximum discount level. More specifically, a quantum of discount provided to the customer increases with increase in discount level up to a maximum discount level. In an illustrative example, the discount rewards program assigned to the customer may include five discount levels, with level five being the maximum discount level and level one being the lowest discount level. Each of the five discount levels may be associated with a predefined discount factor. For example, level 1 may be associated with a predefined discount factor of 10%, level 2 may be associated with the predefined discount factor of 20% and so on and so forth, such that predefined discount factors of 10%, 20%, 30%, 40% and 50% are associated with the levels one, two, three, four and five respectively. As can be seen from the illustrative example, the predefined discount factors increase with increase in the discount level. The increase in the predefined discount factor may be in accordance with a discount factor interval, preset by the user of the system 200, or suggested by the discount rewards program application and selected by the user. As explained above, in some embodiments, the user may assign the predefined discount factors as desired and preclude setting the discount factor interval. The increase in the predefined discount factor in such a case may not be in accordance with a discount factor interval, but may be in accordance with user chosen values (arbitrary values or otherwise) for the various discount levels.

As explained above, the system 200 may caused to discount a bill amount associated with the purchase transaction based on the discount level assigned to the customer as a part of the customer enrollment. In an example embodiment, the discount level assigned to the customer as part of the customer enrollment may be a minimum discount level. In another example embodiment, the discount level assigned to the customer as part of the customer enrollment may be a discount level proportionate to a discount coupon provided by the customer during the purchase transaction. For example, if the customer presents a 20% discount coupon (such a coupon may be presented to the customer by a daily deal website or any such third party website) at the time of enrollment, and if 20% corresponds to second discount level in the discount rewards program schedule selected by the user, then the customer may be assigned the second discount level and not the initial discount level, which may have been assigned to the customer in absence of the discount coupon.

In at least one example embodiment, for a next transaction by the customer at the merchant establishment, for example a second purchase transaction, the system 200 may be caused to determine if the second purchase transaction from the time of customer enrollment is within a predefined time interval from the first purchase transaction executed at the time of customer enrollment. If the second purchase transaction is within the predefined time interval the system 200 may be caused to determine a current discount level for the second purchase transaction by incrementing the discount level to a next discount level. For example, if the discount level during the customer enrollment is at a second discount level, and the predefined time interval for making a second purchase transaction is set to a one month time period, and if the customer visits the merchant establishment within the one month time period for a second purchase transaction, then the discount level of the customer is incremented to the third discount level (i.e. the discount level is incremented by one level for repeating a purchase transaction within a predefined time interval). In such a scenario, the system 200 is caused to increment the discount level and determine the current discount level as the third discount level. In some embodiments, the discount level associated with the customer may be at a maximum discount level. In such a scenario, even if the customer makes a repeat purchase transaction within the predefined time interval, the discount level is not further incremented but retained at the maximum discount level.

In some embodiments, if the next purchase transaction, for example the second purchase transaction, is executed subsequent to completion of the predefined time interval, the system 200 may be caused to decrement the discount level to a lower discount level from among the plurality of discount levels associated with the discount rewards program. The predefined time interval may be reinitialized or reset on lapse of the predefined time interval. In an example embodiment, the discount level may be decremented a number of times proportionate to the number of times the predefined time interval lapses until a minimum discount level is reached. For example, if a customer discount level is at a fourth discount level and the customer make the next purchase after two consecutive predefined time intervals, then as the predefined time interval may have lapsed two times, the discount level is decremented two times to reach the second discount level from the fourth discount level. Accordingly, the system 200 may be caused to determine the current discount level as the second discount level and apply a predefined discount factor associated with the second discount level to the bill amount associated with the next or the second purchase transaction. It is noted that the predefined time interval may be reinitialized upon completion of the second purchase transaction.

In an example embodiment, if a next purchase transaction is executed beyond the predefined time interval but within the subsequent lapse of the reinitialized predefined time interval, the discount level may be decremented to a previous discount level, as the predefined time interval has lapsed by one time interval duration. For example, if the second purchase transaction occurs within a month of reinitializing a predefined time interval of a month, and the customer discount level was a second discount level at the time of previous purchase transaction, then the discount level may be decremented to the first discount level, which is the previous discount level to the second discount level. Accordingly, the system 200 may be caused to determine the current discount level as the first discount level and apply a predefined discount factor associated with the first discount level to the bill amount associated with the next or the second purchase transaction. It is noted that the predefined time interval may be reinitialized upon completion of the second purchase transaction.

In an example embodiment if the discount level is at a minimum discount level, and the next purchase transaction occurs beyond the predefined time interval the system 200 may retain the discount level at the minimum discount level. As a result, the system 200 maintains provision of a minimum discount corresponding to the minimum discount level to the customer for each purchase transaction.

The process explained above may be repeated for each purchase transaction, such that the discount level is incremented if the customer makes a repeat purchase transaction within the predefined time interval up to a maximum discount level, and the discount level is decremented every time the customer misses a purchase transaction within the predefined time interval. For any given purchase transaction, the system 200 may be caused to determine a current discount level and apply a predefined discount factor as per the current discount level to the billed amount. The discounted bill amount may be provided to the customer to reward the customer. Further, the processor 202 may reinitialize the predefined time interval subsequent to completion of a purchase transaction or on expiry of the predefined time interval. The various UIs facilitating a provisioning of values corresponding to the discount levels, discount factor intervals and the predefined time interval are explained next with reference to FIGS. 4A to 4C and FIG. 5.

Figure 4A:
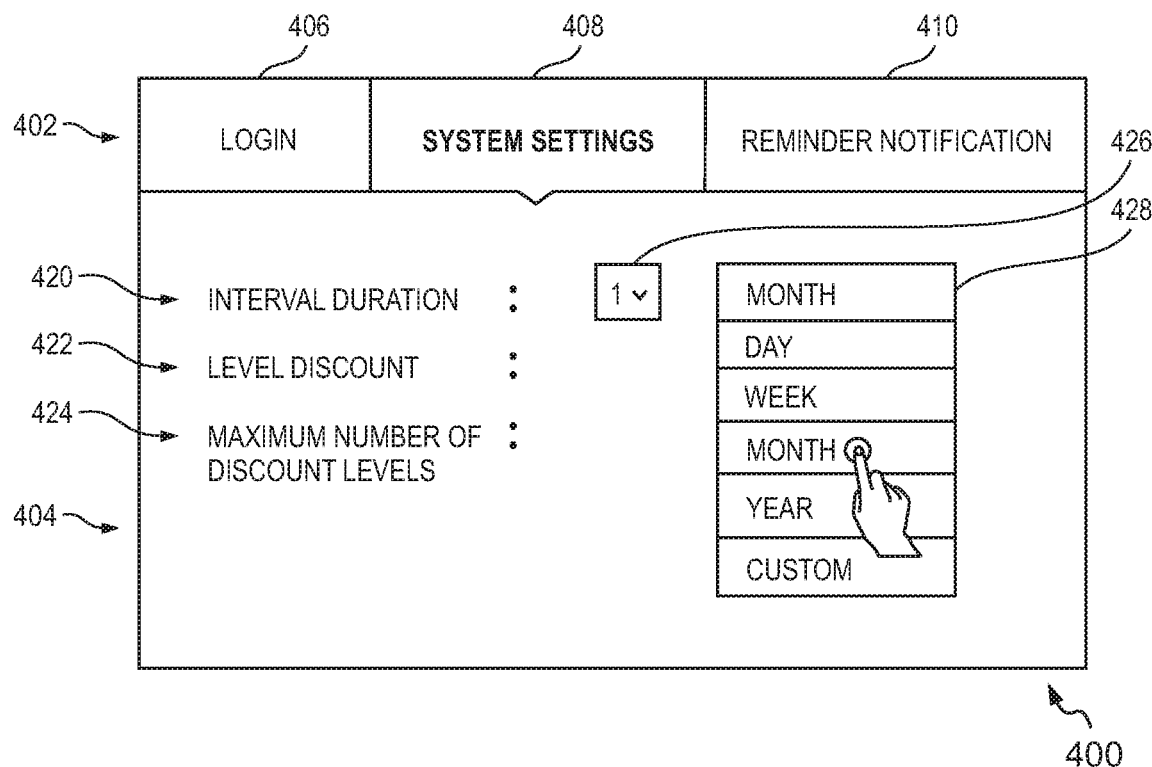
FIGS. 4A, 4B and 4C show a second UI displayed to a user of the system of FIG. 2 for facilitating an administering of the discount rewards program to a customer of a merchant establishment, in accordance with an example embodiment.

Referring now to FIG. 4A, a second UI 400 displayed to a user of the system 200 for facilitating an administering of the discount rewards program to a customer of a merchant establishment is shown, in accordance with an example embodiment. As explained above, the user of the system 200 may correspond to a merchant associated with the merchant establishment or to a representative of the merchant establishment tasked with manning the checkout counter. The second UI 400 may be displayed on a display screen of a POS terminal by the display module 212 of the system 200. Alternatively, the second UI 400 may be displayed on display screen of an electronic device associated with a merchant in order to enable the merchant to set/change parameters of the discount rewards program for his/her customers.

The second UI 400 is depicted to display a menu section 402 and an option selection section 404. The menu section 402 is depicted to include a 'login' tab 406, a 'system settings' tab 408, and a 'reminder notification' tab 410. The 'reminder notification' tab 410 may enable the user of the system 200 to set up reminder notifications (as will be explained later with reference to FIG. 5), whereas the 'login' tab 406 is configured to enable the user of the system 200 to login to the discount rewards program application. In an example embodiment, a selection of the 'login' tab 406 may cause the display module 212 (not shown in FIG. 4A) to display a UI including form fields for receiving textual input corresponding the user's login credentials (such as username and password). The user of the system 200 may provide the relevant login information to login to the discount rewards program application.

The option selection section 404 corresponds to the 'system settings' tab 408. The option selection section 404 is configured to enable the user of the system 200 to set/change one or more parameters of the discount rewards program application to administer the discount rewards program to one or more customers of the merchant establishment. In an embodiment, the option selection section 404 is depicted to display three fields capable of receiving user selection input. More specifically, the option selection section 404 is configured to display a field 420 (labeled as 'Interval Duration' in FIG. 4A) for setting a predefined time interval, a field 422 (labeled as 'Level Discount' in FIG. 4A) for setting a discount factor interval and a field 424 (labeled as 'Maximum number of discount levels' in FIG. 4A) for setting a maximum number of discount levels.

The field 420 for setting the predefined time interval is depicted to be associated with two drop-down menus with a first drop-down menu 426 enabling selection of a numerical input (exemplarily depicted to be chosen as '1') and a second drop-down menu 428 including options, such as day, week, month, year and custom (i.e. for setting a custom time interval). A user of the system 200 may select an option from among the several options to set the predefined time interval. In the example representation depicted in FIG. 4A, the user of the system 200 is depicted to have chosen the value of the predefined time interval as '1 month'. As explained above, the predefined time interval represents a time interval during which the customer needs to complete the next purchase transaction to avail discount worth the predefined discount factor corresponding to the next discount level.

Figure 4B:
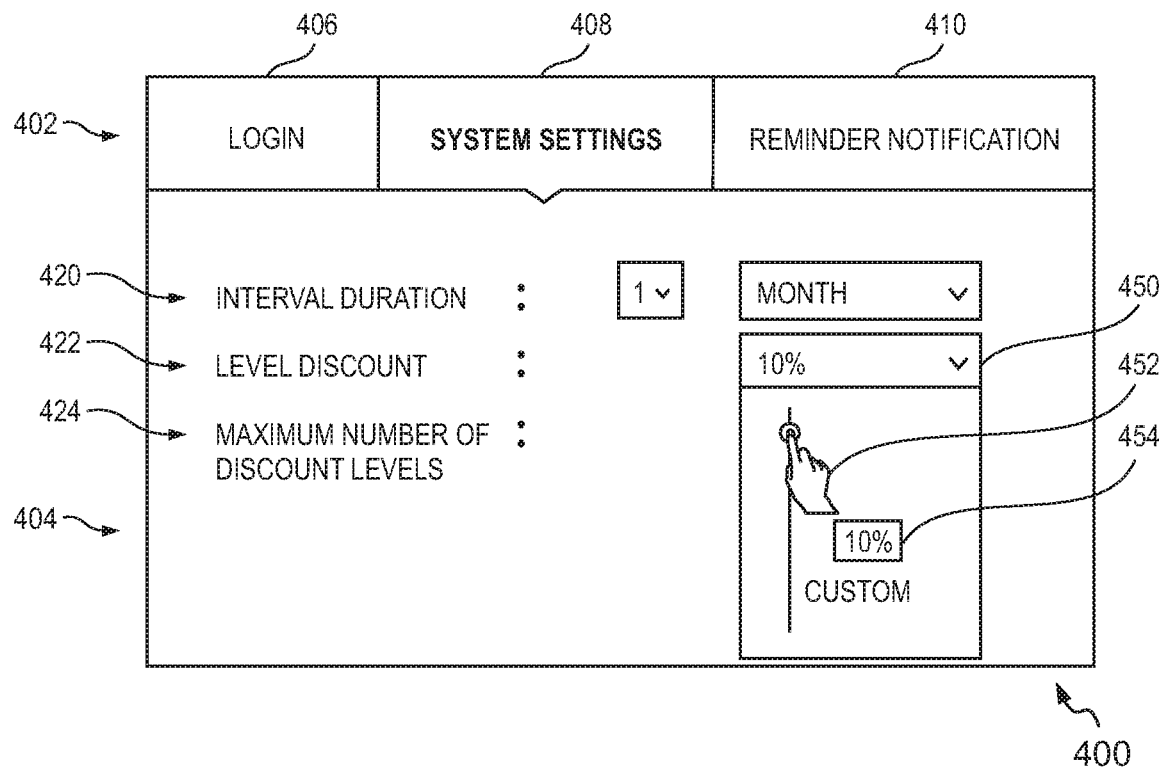

Referring now to FIG. 4B, an example text entry 450 in the field 422 associated with selecting the discount factor interval is shown, in accordance with an example embodiment. More specifically, FIG. 4B depicts a screenshot of the second UI 400 explained with reference to FIG. 4A, with user input corresponding to the predefined time interval already received and the user in the process of selecting the discount factor interval. Further, as explained with reference to FIG. 4A, the field 422 corresponds to the discount factor interval (labeled as 'discount level' in the second UI 400). As an illustrative example, the field 422 is depicted to display a text entry value 450 of 10%, implying that the discount factor interval chosen by the user is 10%. Such a selection of the discount factor interval may cause predefined discount factors associated with multiple discount levels to increase by 10% for every next discount level (or to decrease by 10% for every previous discount level). The discount factor interval may be chosen using a sliding scale option 452. Further, a predefined optimum value, as per industry settings, may also be suggested to the user as depicted by the text box 454 (labeled as 'custom'). As an illustrative example, a suggested value of discount factor interval is depicted to be 10%. It is noted that the user may use the suggestion or select a value for the discount factor interval based on own volition. Though, the UI 400 is depicted to provision an option to select the discount factor interval, in some embodiments, the UI 400 may configured to depict text boxes corresponding to a number of discount levels chosen, and the user may provide desired discount factor values for each discount level instead of providing the discount factor interval.

Figure 4C:
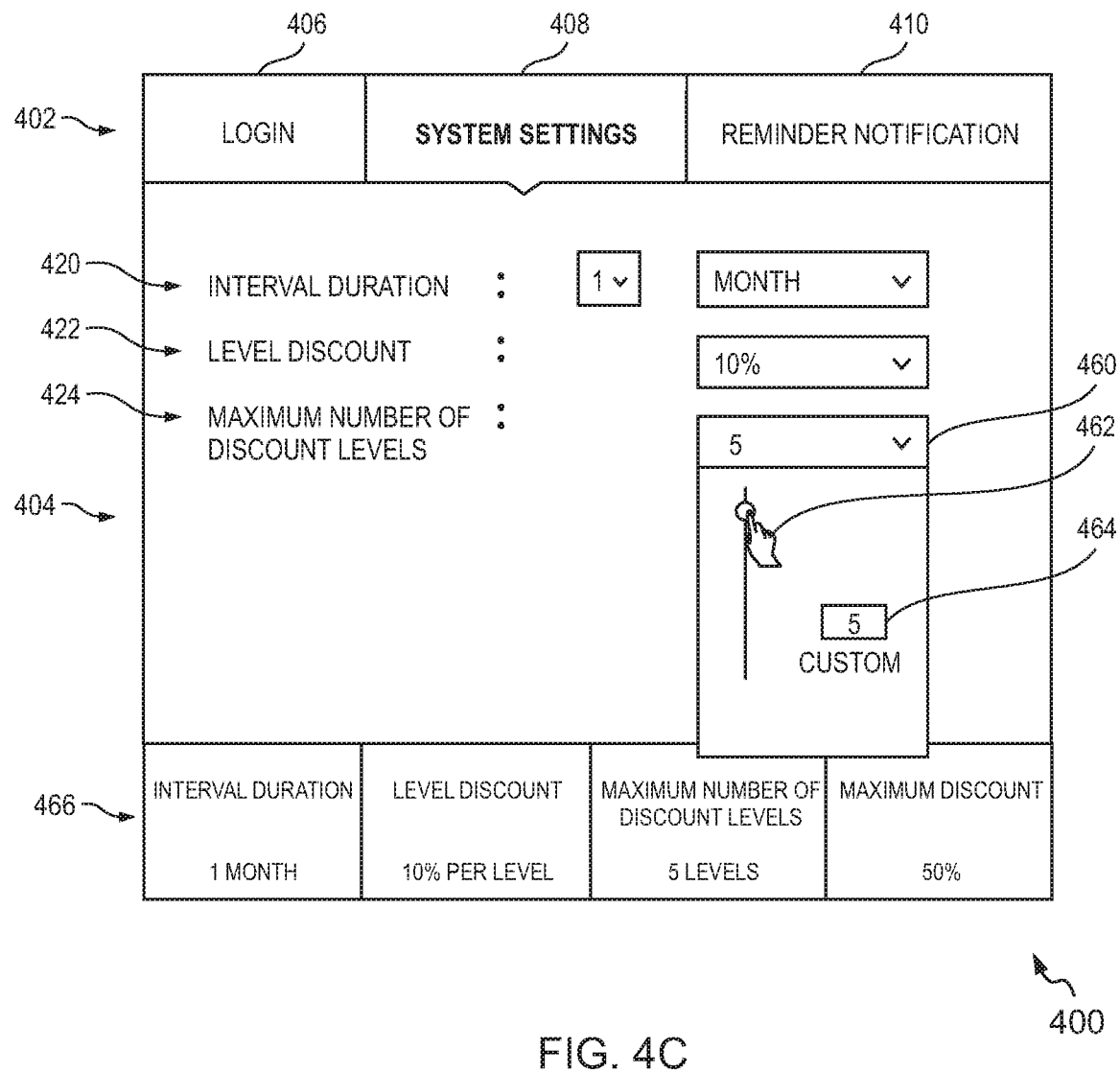

Referring now to FIG. 4C, an example text entry 460 in the field 424 associated with selecting the maximum number of discount levels is shown, in accordance with an example embodiment. More specifically, FIG. 4C depicts a screenshot of the second UI 400 explained with reference to FIG. 4A, with user input corresponding to the predefined time interval and the discount factor interval already received and the user in the process of selecting the maximum number of discount levels. Further, as explained with reference to FIG. 4A, the field 424 corresponds to the maximum number of discount levels. The user of the system 200 may slide a scale included in the sliding scale option 462 to set the maximum number of discount levels possible for the discount rewards program to be extended to the customer of the merchant establishment. As an illustrative example, the user of the system 200 is depicted to have selected a value of 'five' on the sliding scale option 462 to set the maximum number of discount levels to be five levels as exemplarily depicted in the text box 460. Further, a predefined optimum value, as per industry settings, may also be suggested to the user as depicted by the text box 464 (labeled as 'custom'). As an illustrative example, a suggested value of maximum number of discount levels is depicted to be five. It is noted that the user may use the suggestion or select a value for the discount factor interval based on own volition.

In FIG. 4C, the second UI 400 is also depicted to display a summary section 466 outlining the options selected by the user of the system 200 corresponding to the parameters for predefined time interval, discount factor interval, maximum number of discount levels, and maximum discount. For the purposes of the description, user input corresponding to each of these parameters is referred to herein as first input. Accordingly, the first input provided by the user is summarized in the summary section 466. The first input is depicted to be one month predefined time interval, 10% discount factor interval and a maximum of five discount levels (thereby configuring the maximum discount to be 50%). More specifically, the five discount levels associated with the discount rewards program based on such a first input may be first, second, third, fourth, and fifth discount levels respectively. Further, a predefined discount factor of the first discount level may be identified by computing a mathematical product of the first discount level (i.e. one) and a value of the discount factor interval (i.e. 10%), which equals 10%. Similarly, the predefined discount factor of the second, third, fourth, and fifth discount levels may be computed as 20%, 30%, 40% and 50% respectively.

As explained above, the processor 202 of the system 200 may cause the system 200 to provide at least one suggestion corresponding to the first input such that the suggestion(s) may comprise respective predetermined optimum values for the predefined time interval, the discount factor interval, and the maximum number of discount levels based on an industry corresponding to the merchant establishment. Industry standard settings for predefined time interval, the discount factor interval, and the maximum number of discount levels may be preset (for example, as default values) to achieve a high loyalty attachment from the customer towards the merchant establishment. For example, the values for each of these parameters may differ for different service industries, like hospitality, health care, retail etc. Accordingly, optimum values based on industry research may be set as default values for each of these parameters, which may serve as suggestions to the merchant. The merchant may choose to retain the default values or change the values (as explained with reference to FIGS. 4A to 4C) to provision the first input.

As explained with reference to FIG. 2, for each subsequent purchase transaction, the system 200 may be caused to determine a current discount level based on determining whether the respective purchase transaction is made within the predefined time interval from a previous purchase transaction. Further, the system 200 may discount a bill amount associated with the respective purchase transaction based on the current discount level and provide the discounted bill amount to the customer. Furthermore, the system 200 may reinitialize the predefined time interval subsequent to the respective purchase transaction.

The administering of the discount rewards program is further explained with reference to an illustrative example below.

In an example scenario, customer may be assigned a first discount level as a part of customer enrollment and a bill amount may be discounted by 10%. Furthermore, the user of the system 200 may provide a first input as a part of the customer enrollment. The first input may include values of discount factor interval as 10%, maximum number of discount levels as 5, and the predefined time interval as 1 month. Based on such an input, the system 200 may be caused to define five discount levels, with the fifth discount level being the maximum discount level and the first discount level being the lowest discount level among the five discount levels. Further, each discount level may be associated with a predefined discount factor of 10%, 20%, 30%, 40% and 50%.

Further, if a next purchase transaction (i.e. a second purchase transaction) is made within the predefined time interval of one month, the system 200 may be caused to increment the customer's discount level from the first discount level to the next discount level, i.e. to a second discount level. The current discount level may be determined to be the second discount level. The bill amount corresponding to the next purchase transaction may be discounted by 20% which is the predefined discount factor associated with the second discount level. The predefined time interval may be reinitialized (i.e. the time counter for computing the one month time interval may be reset to zero) subsequent to the second purchase transaction.

For a subsequent purchase transaction, the current discount level may be incremented to the next discount level if the subsequent transaction is made within the predefined interval of one month. Hence, if a third purchase transaction is made within one month of the second purchase transaction the current discount level which is the second discount level may be incremented to the third discount level, and the bill amount corresponding to the third purchase transaction may be discounted by the predefined discount factor associated with the third discount level, which is 30%. The predefined time interval may be reinitialized subsequent to the third purchase transaction.

The aforesaid process of determining the current discount level for the subsequent purchase transaction may be repeated for each subsequent purchase transaction. In an example scenario, if the subsequent purchase transactions occur in consecutive predefined time intervals, the current discount level may be incremented up to a maximum discount level of 50% by the fifth purchase transaction. Further, if a new purchase transaction occurs within the predefined time interval from the fifth purchase transaction the system 200 may be caused to maintain the current discount level at the maximum discount level of 50%.

In the said example, if the third purchase transaction occurs beyond the predefined time interval of one month from the second purchase transaction but within a subsequent lapse of the reinitialized predefined time interval which is within two months of the second purchase transaction, the discount level may be decremented to a previous discount level which is the first discount level.

In another example scenario, the discount level may be decremented a number of times proportionate to the number of times the predefined time interval lapses until the minimum discount level is reached. For example, if the current discount level during a fourth transaction is at a fourth discount level and a fifth transaction occurs when the predefined time interval lapses three times before the fifth purchase transaction is made, then the current discount level may be decremented three times from the fourth discount level and hence the current discount level for the fifth transaction may be at the first discount level.

In an example embodiment, the discount level may be further incremented from the next discount level to a higher discount level if a customer referral enrolls with the discount rewards program. In another example embodiment, the referral discount may be provided when the customer referral makes a purchase transaction with the merchant offering the discount rewards program. In an illustrative example, if the discount rewards program offers a referral discount of 10% when a customer referral enrolls, and the current discount level for an ongoing purchase transaction is second discount level, then the discount level may be further incremented to a higher discount level, for example to the third discount level, for the ongoing purchase transaction.

In another embodiment, the current discount level may be capable of being retained for one or more future purchase transactions based on predefined criterion. For example, a merchant may provide a level-locking feature for corporate employee customers such that the discount level of the corporate employee customers may be locked to a particular discount level as specified during enrollment of the corporate employees into the discount rewards program. As a result, the merchant may avoid providing a maximum discount to all the corporate employees all the time, and may achieve higher retention of the corporate employees by providing the same discount level for subsequent purchases as provided during the enrollment.

In at least one example embodiment, the availability of the predefined discount factor corresponding to the next discount level for a time period corresponding to the predefined time interval may be communicated to the customer by one or more reminder notifications via the communication interface 208. The one or more reminder notifications may include date reminders to remind the customer of the predefined discount factor to be availed for the next purchase at the merchant establishment and a time left for the predefined time interval to lapse. The reminder notifications may be sent to the customer to compel the customer to make the next purchase transaction before expiry of the predefined time interval. The provisioning of the reminder notifications is explained with reference to FIG. 5.

Figure 5:
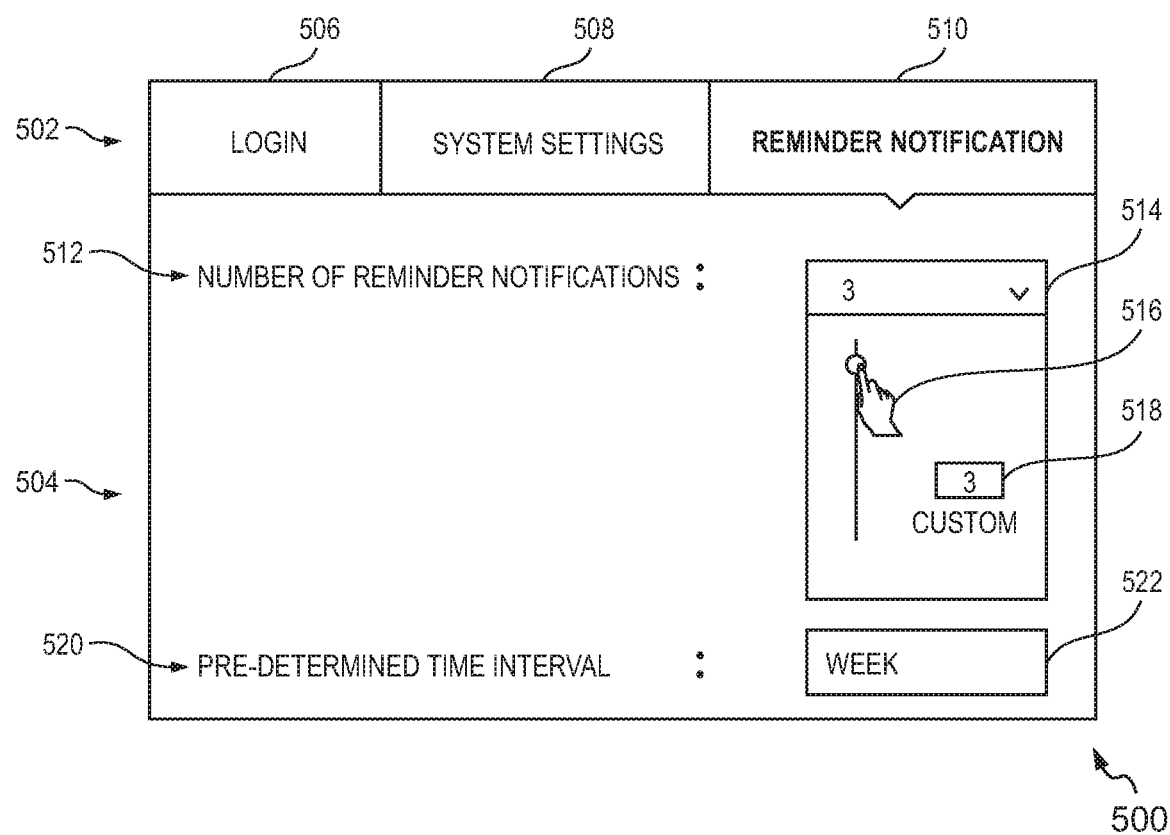
FIG. 5 shows a third UI displayed to the user of the system of FIG. 2 upon selection of the reminder notifications tab shown in FIGS. 4A-4C, in accordance with an example embodiment.

FIG. 5 shows a third UI 500 displayed to the user of the system 200 upon selection of the reminder notification tab shown in FIGS. 4A-4C, in accordance with an example embodiment. The third UI 500 may be displayed to the user of the system 200 for facilitating a provisioning of a second input corresponding to a number of reminder notifications to be sent to the customers of the discount rewards program. The third UI 500 displays a menu section 502, which is similar to the menu section 402 explained with reference to FIGS. 4A to 4C and is not explained again herein. More specifically, the menu section 502 displays the 'Login' tab 506, the 'System settings' tab 508 and the 'Reminder notification' tab 510. The third UI 500 further includes a reminder notification setting section 504. The reminder notification setting section 504 is configured to display a field 512 labeled 'Number of reminder notifications' along with a sliding scale option 516 configured to enable the user of the system 200 to select a numerical value 514 (exemplarily depicted to be '3') corresponding to a number of reminder notifications to be sent to the customer for reminding the customer of the time left for availing discount before expiry of the predefined time interval. In FIG. 5, the user of the system 200 is depicted to have selected a value of three implying three reminder notifications need to be sent to the customer. Further, a predefined optimum value, as per industry settings, may also be suggested to the user as depicted by the text box 518 (labeled as 'custom'). As an illustrative example, a suggested value of number of reminder notifications is depicted to be '3'. It is noted that the user may use the suggestion or select a value for the number of reminder notifications based on own volition.

The reminder notification setting section 504 is further depicted to display a field 520 labeled 'time interval' associated with a drop-down menu 522 configured to enable the user of the system 200 to select a time interval for sending the reminder notifications. In FIG. 5, the user of the system 200 is depicted to have selected the Weekly option. Accordingly, one reminder will be sent to the customer each of the last three weeks prior to the expiry of the predefined time interval.

Based on the above input for a number of reminder notifications, also referred to herein as a second input, a maximum of three reminder notifications may be communicated to the customer during the predefined time interval, where a first reminder notification may be communicated after lapse of a week from the commencement of the predefined time interval, a second reminder notification may be communicated after a week of communication of the first reminder notification and a third reminder notification may be communicated after a week of communication of the second reminder notification. If the customer makes the next purchase after a reminder notification, then no more reminder notifications may be communicated to the customer. Hence, the maximum of three reminder notifications may be communicated to the customer only if the customer fails to make the next purchase before the number of reminder notifications is communicated.

As explained above, the system 200 may be caused to provide at least one suggestion corresponding to the second input such that the at least one suggestion may include respective predefined optimum input value for an industry corresponding to the merchant establishment. For example, the number of reminder notifications may be optimized based on the at least one suggestion in order to achieve higher efficiency in the discount rewards program for the merchant. A method for administering a discount rewards program is explained hereinafter with reference to FIG. 6.

Figure 6:
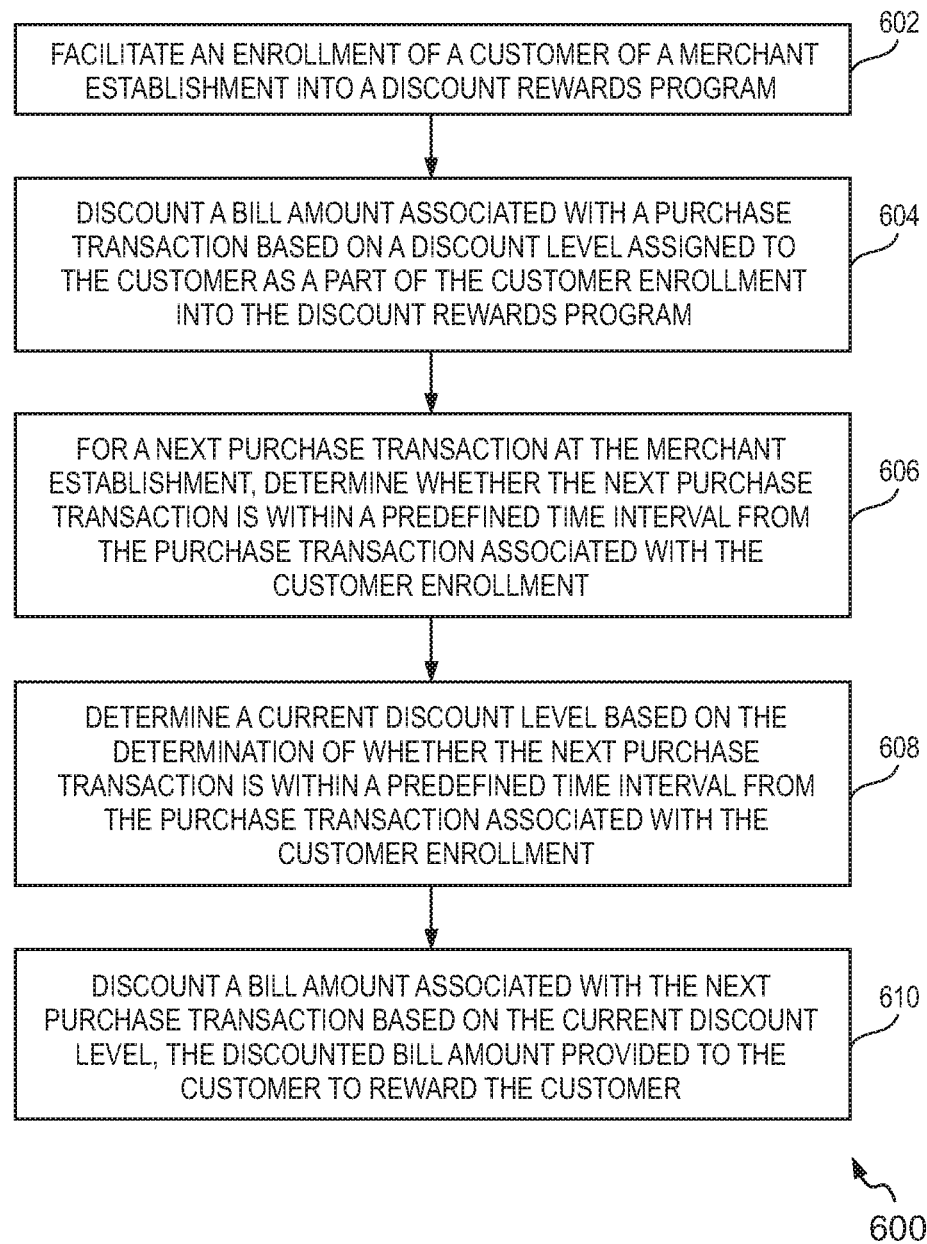
FIG. 6 illustrates an example flow diagram of a method for administering a discount rewards program to customers of a merchant establishment, in accordance with an example embodiment.

FIG. 6 illustrates an example flow diagram of a method 600 for administering a discount rewards program, in accordance with an example embodiment. The method 600 depicted in the flow diagram may be executed by, for example, the system 200 explained with reference to FIGS. 2 to 5. Operations of the flowchart, and combinations of operation in the flowchart may be implemented by, for example, hardware, firmware, a processor, circuitry, and/or a different device associated with the execution of software that includes one or more computer program instructions for administering discount rewards program to several customers of the merchant establishment. The operations of the method 600 are described herein with help of the system 200. For example, one or more operations corresponding to the method 600 may be executed by a processor, such as the processor 202 of the system 200. It is noted that although the one or more operations are explained herein to be executed by the processor alone, it is understood that the processor is associated with a memory, such as the memory 204 of the system 200, which is configured to store machine executable instructions for facilitating the execution of the one or more operations. It is also noted that, the operations of the method 600 can be described and/or practiced by using an apparatus other than the system 200. The method 600 starts at operation 602.

At operation 602 of the method 600, an enrollment of the customer of a merchant establishment into a discount rewards program is facilitated. In an example embodiment, a customer engaged in a purchase transaction at the merchant establishment may be requested to enroll in the discount rewards program. Upon acceptance of the offer to enroll, a UI such as first UI 300 explained with reference to FIG. 3, may be provisioned to a merchant or a representative at the merchant establishment to facilitate enrollment of the customer in the discount rewards program.

At operation 604 of the method 600, a bill amount associated with the purchase transaction is discounted based on a discount level assigned to the customer as a part of the customer enrollment into the discount rewards program. The discount level assigned to the customer is one of a plurality of discount levels associated with the discount rewards program. Further, each discount level from the plurality of discount levels is associated with a respective predefined discount factor.

In an embodiment, the discount level assigned to the customer as part of the customer enrollment is a minimum discount level. For example, if the minimum discount level is a first discount level and the first discount level is associated with a predefined discount factor of 15%, then the bill amount associated with the purchase transaction is discounted by 15%. In an embodiment, the discount level assigned to the customer as part of the customer enrollment is proportionate to a discount coupon provided by the customer during the purchase transaction. For example, if the customer provides a discount coupon of 35% at the time of enrollment and a discount level of 35% corresponds to a third discount level, then the third discount level is assigned to the customer as a part of the customer enrollment into the discount rewards program.

In at least one example embodiment, the predefined discount factor is configured to increase with increase in discount level up to a maximum discount level. For example, a predefined discount factor associated with the first discount level may be 10% and the predefined discount factor associated with the second discount level may be 20% and so on and so forth.

In an embodiment, a provisioning of a first input related to at least one of the predefined time interval, a discount factor interval corresponding to an interval between predefined discount factors associated with the plurality of discount levels and a maximum number of discount levels may be facilitated. In an embodiment, in addition to facilitating a provisioning of the first input, a provisioning of a second input related to a number of reminder notifications may be facilitated. The provisioning of the first input and the second input may be performed by providing UIs, such as the second UI 400 and the third UI 500 as explained with reference to FIGS. 4A-4C and 5, respectively, and is not explained herein.

At operation 606 of the method 600, for a next purchase transaction at the merchant establishment, it is determined whether the next purchase transaction is within a predefined time interval from the purchase transaction associated with the customer enrollment. In an example scenario, the predefined time interval may be chosen to be one-month time interval. Accordingly, for a next customer purchase transaction at the merchant establishment, it may be determined whether the transaction is within a one-month time interval from the previous purchase transaction.

At operation 608 of the method 600, a current discount level is determined based on the determination of whether the next purchase transaction is within a predefined time interval from the purchase transaction associated with the customer enrollment. More specifically, the current discount level is determined by incrementing the discount level to a next discount level from among the plurality of discount levels if the next purchase transaction is within the predefined time interval. However, if the discount level is retained if the discount level is at the maximum discount level. Alternatively, the current discount level is determined by decrementing the discount level to a lower discount level from among the plurality of discount levels if the next purchase transaction is beyond the predefined time interval. However, the discount level is retained if the discount level is at a minimum discount level.

At operation 610 of the method, a bill amount associated with the next purchase transaction is discounted based on the current discount level. The discounted bill amount is provided to the customer to reward the customer. In an embodiment, the predefined time interval is reinitialized subsequent to completion of the next purchase transaction and thereafter for each subsequent purchase transaction, the operations of determining a time elapsed since previous purchase transaction, determining a current discount level, discounting a bill amount based on the current discount level and reinitializing the predefined time interval may be performed to administer discount rewards program to the customer.

Another method for administering a discount rewards program is explained with reference to FIGS. 7A-7C.

Figure 7A:
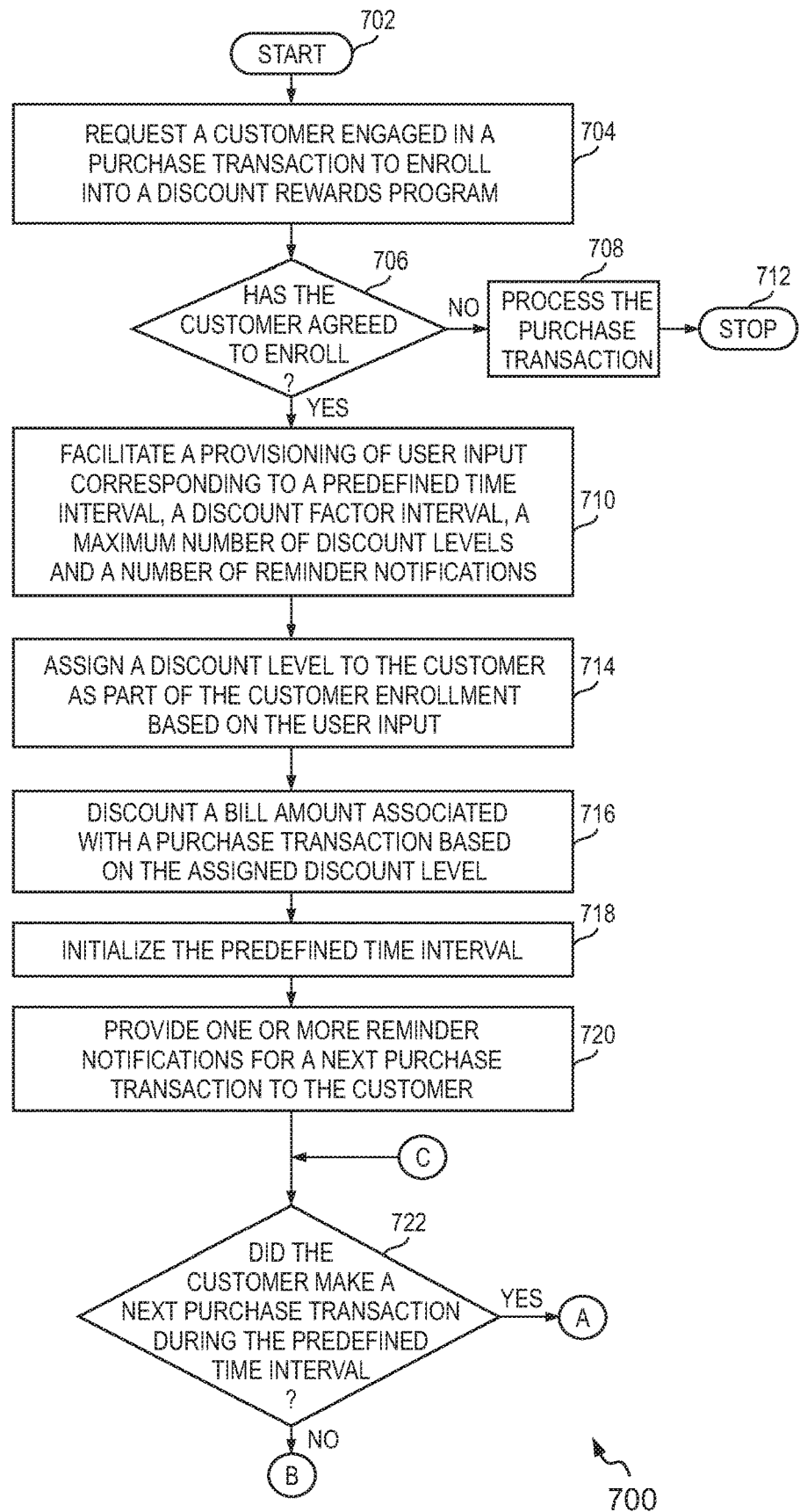
FIGS. 7A, 7B and 7C illustrate an example flow diagram of a method for administering a discount rewards program to customers of a merchant establishment, in accordance with another example embodiment.
Figure 7B:
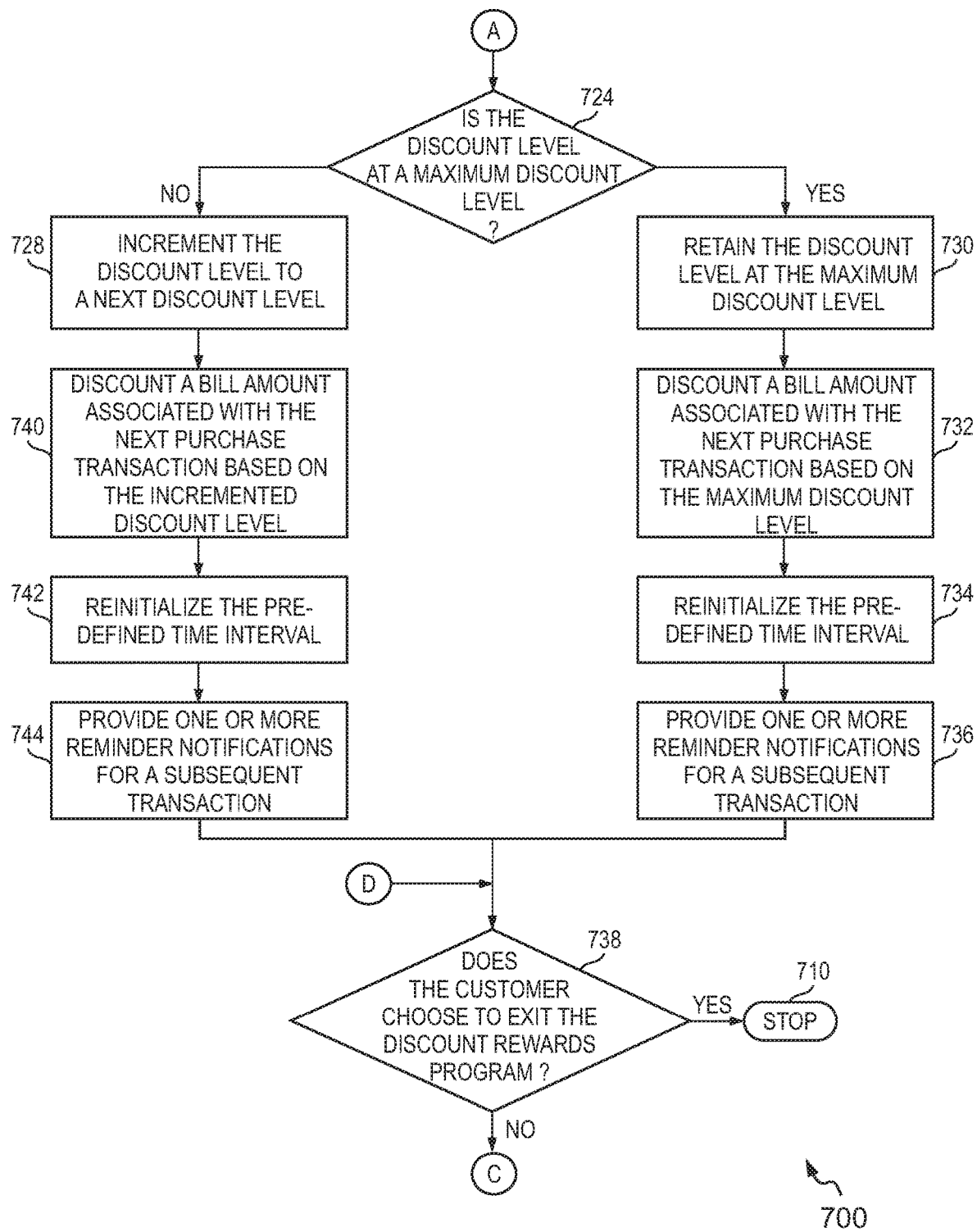
Figure 7C:
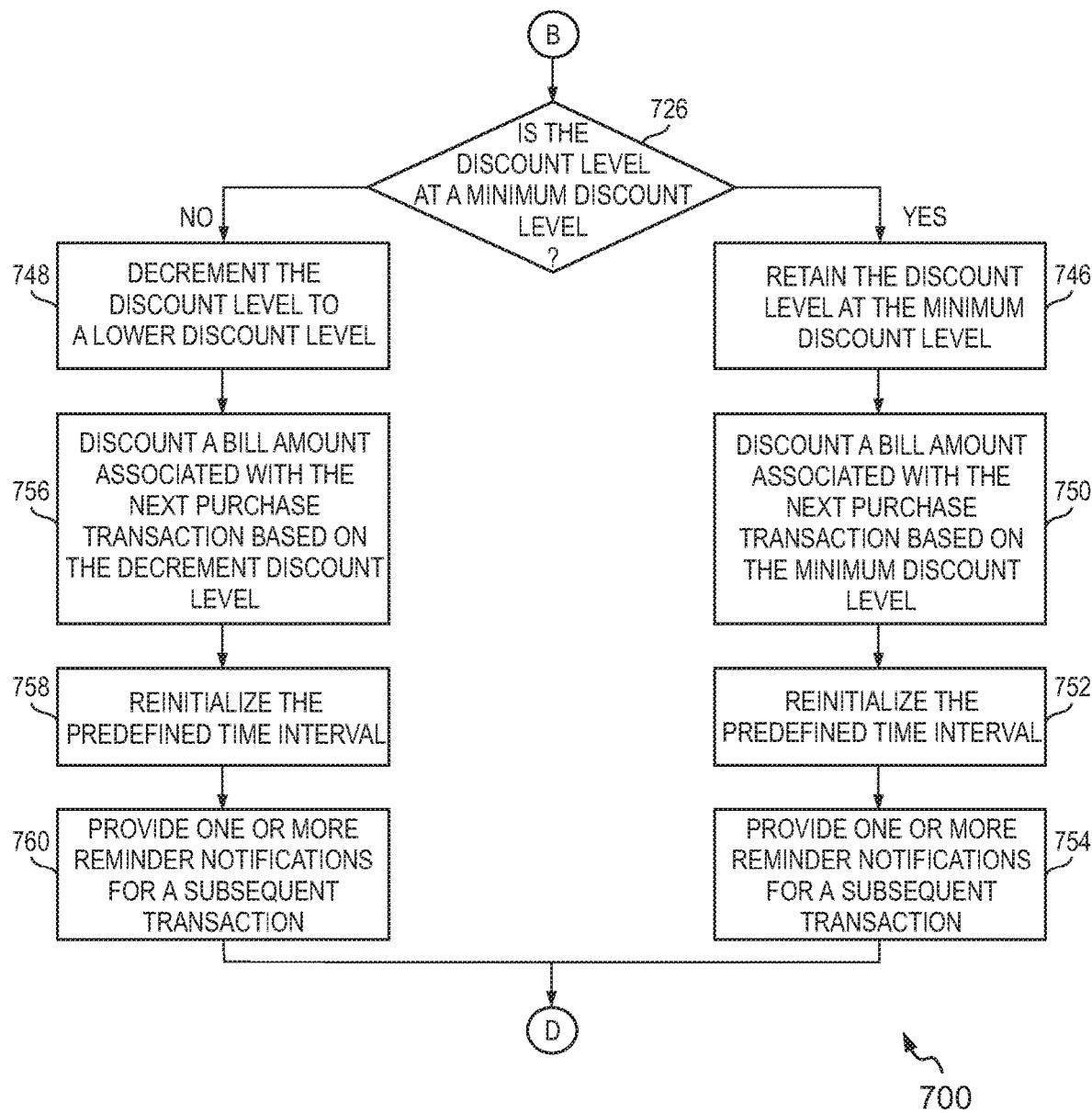

FIGS. 7A, 7B and 7C illustrate an example flow diagram of a method 700 for administering a discount rewards program, in accordance with another example embodiment. The method 700 may be performed by the system 200 explained with reference to FIGS. 2 to 5. The method 700 starts at operation 702. At operation 702 of the method, a customer may engage in a purchase transaction at a merchant establishment.

At operation 704 of the method 700, the customer may be requested to enroll into a discount rewards program associated with the merchant establishment. At operation 706, it is determined whether the customer has agreed to enroll into the discount rewards program. If the customer disagrees to enroll in the discount rewards program, then operation 708 is performed. If the customer agrees to enroll in the discount rewards program, then operation 710 is performed.

At operation 708 of the method 700, the purchase transaction may be processed. For example, if the customer provides a daily deal discount coupon then the customer bill amount is discounted and the purchase transaction is processed based on the discounted bill amount. If the customer does not provide any discount coupon, then the purchase transaction may be processed at a full amount chargeable for the product(s) bought or the service(s) availed. The method 700 stops at operation 712.

At operation 710 of the method 700, a provisioning of user input corresponding to a predefined time interval, a discount factor interval, a maximum number of discount levels and a number of reminder notifications for the discount rewards program is facilitated as a part of customer enrollment.

At operation 714 of the method 700, a discount level is assigned to the customer as part of the customer enrollment based on the user input. At operation 716 of the method 700, a bill amount associated with the purchase transaction may be discounted based on the assigned discount level. At operation 718 of the method 700, the predefined time interval may be initialized. At operation 720 of the method 700, one or more reminder notifications for a next purchase transaction are provided to the customer. The one or more reminder notifications may include date reminders of availability of a next discount level for the next purchase transaction.

At operation 722 of the method 700, it is determined whether the customer made a next purchase transaction within the predefined time interval. If the next purchase transaction is within the predefined time interval, then operation 724 is performed. If the next purchase transaction is not within the predefined time interval, then operation 726 is performed.

At operation 724 of the method 700, it is determined whether the discount level is at a maximum discount level. If the discount level is determined to be below the maximum discount level, then operation 728 is performed. Alternatively, if the discount level is determined to be at the maximum discount level, then operation 730 is performed.

At operation 730 of the method 700, the discount level is retained at the maximum discount level. Further, at operation 732 of the method 700, a bill amount associated with the next purchase transaction is discounted based on the maximum discount level. At operation 734 of the method 700, the predefined time interval is reinitialized. At operation 736 of the method 700, one or more reminder notifications are provided to the customer to indicate availability of a maximum discount level for a subsequent purchase transaction. Thereafter, operation 738 of the method 700 is performed.

At operation 728 of the method 700, the discount level is incremented to a next discount level from among the plurality of discount levels. Further, at operation 740 of the method 700, a bill amount associated with the next purchase transaction is discounted based on the next discount level. At operation 742 of the method 700, the predefined time interval is reinitialized. At operation 744 of the method 700, one or more reminder notifications are provided to the customer of availability of a higher discount level for a subsequent purchase transaction. Thereafter, operation 738 of the method 700 is performed.

At operation 738 of the method 700, it is determined whether the customer chooses to exit the discount rewards program. If yes, then operation 712 is performed. Alternatively, if the customer chooses to continue with the discount rewards program, then operations of the method 700 from operation 722 onwards are repeated.

At operation 726 of the method 700, it is determined whether the discount level is at a minimum discount level. If the discount level is determined to be at the minimum discount level, then operation 746 is performed. Alternatively, if the discount level is determined to be above the minimum discount level, then operation 748 is performed.

At operation 746 of the method 700, the discount level is retained at the minimum discount level. At operation 750, a bill amount associated with the next purchase transaction is discounted based on the minimum discount level. At operation 752 of the method 700, the predefined time interval is reinitialized. At operation 754 of the method 700, one or more reminder notifications are provided to the customer to indicate availability of a higher discount level for a subsequent transaction. Thereafter, operation 738 is performed.

At operation 748 of the method 700, the discount level is decremented to a lower discount level. At operation 756 of the method 700, a bill amount associated with the next purchase transaction is discounted based on the decremented discount level. At operation 758 of the method 700, the predefined time interval is reinitialized. At operation 760 of the method 700, one or more reminder notifications are provided to the customer of availability of the higher discount level for a subsequent transaction. Thereafter operation 738 is performed.

The method 700 stop at operation 712 if the customer chooses to exit the discount rewards program.

Figure 8:
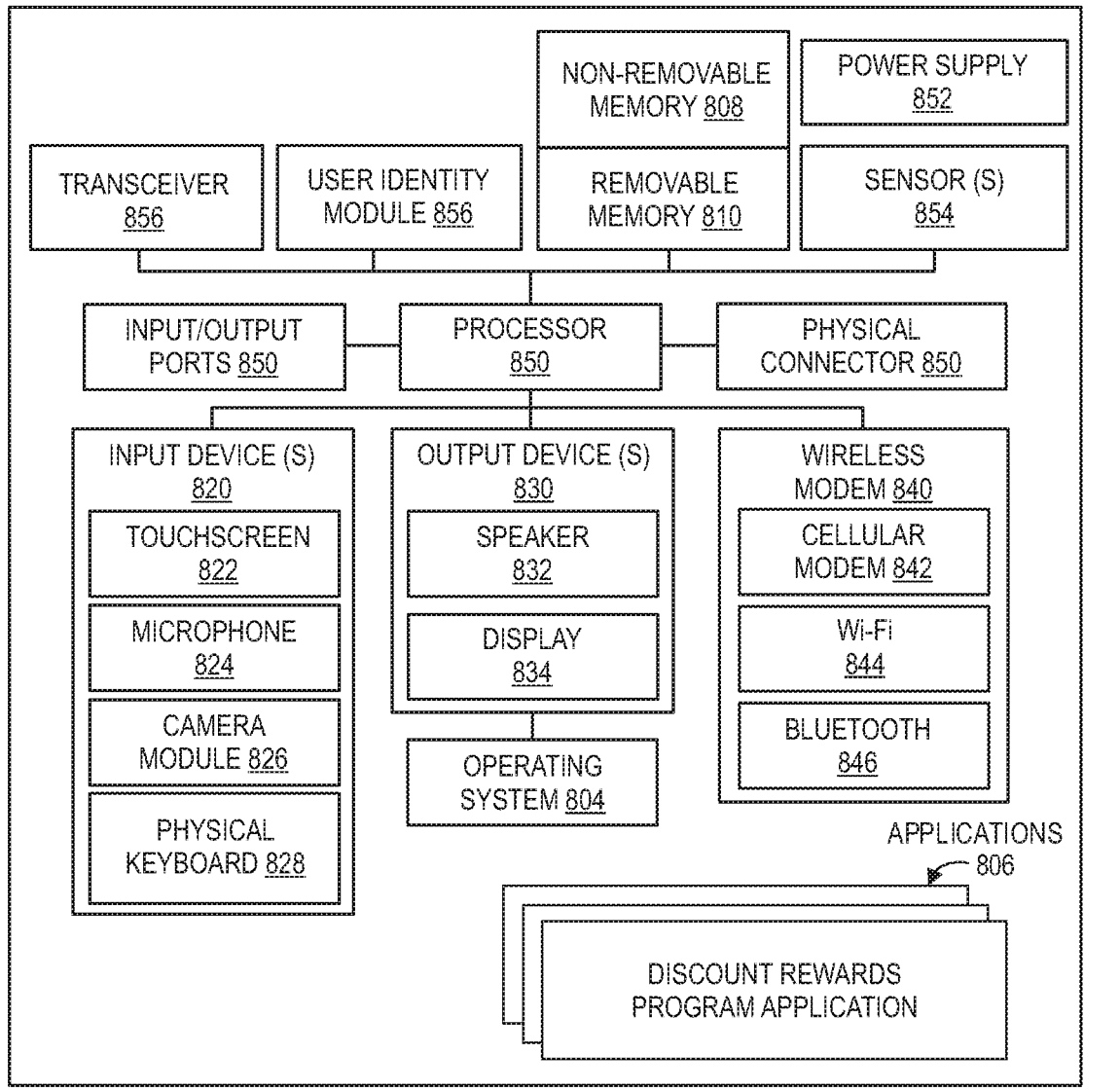
FIG. 8 illustrates an example of an electronic device capable of implementing example embodiments described herein.

The disclosed methods 600 and 700 may be implemented using software including computer-executable instructions stored on one or more computer-readable media (e.g., non-transitory computer-readable media, such as one or more optical media discs, volatile memory components (e.g., DRAM or SRAM), or nonvolatile memory or storage components (e.g., hard drives or solid-state nonvolatile memory components, such as Flash memory components) and executed on a computer (e.g., any suitable computer embedded in a device, such as a laptop computer, net book, web book, tablet computing device, smart phone, or other mobile computing device). Such software may be executed, for example, on a single local computer or in a network environment (e.g., via the Internet, a wide-area network, a local-area network, a remote web-based server, a client-server network (such as a cloud computing network), or other such network) using one or more network computers. Additionally, any of the intermediate or final data created and used during implementation of the disclosed methods or systems may also be stored on one or more computer-readable media (e.g., non-transitory computer-readable media) and are considered to be within the scope of the disclosed technology. Furthermore, any of the software-based embodiments may be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (includ- Referring now to FIG. 8, a schematic block diagram of an electronic device 800 is shown that is capable of implementing embodiments of techniques for administering discount rewards programs as described herein. It is noted that the electronic device 800 as illustrated and hereinafter described is merely illustrative of one type of device and should not be taken to limit the scope of the embodiments. As such, it should be appreciated that at least some of the components described below in connection with the electronic device 800 may be optional and thus in an example embodiment may include more, less or different components than those described in connection with the example embodiment of FIG. 8. As such, among other examples, the electronic device 800 could be any of device from among fixed electronic devices, such as desktop computers, point of sale terminals, and electronic kiosks, to mobile electronic devices, such as for example, personal digital assistants (PDAs), mobile televisions, cellular phones, tablet computers, laptops, mobile computers or any combination of the aforementioned, and other types of communication or multimedia devices.

In at least one example embodiment, the electronic device 800 may be a POS terminal in which a discount rewards program application may be installed and running. Alternatively, the electronic device 800 may correspond to a server capable of communicating with personal devices of online customers for administering discount rewards program to the online customers. In at least one embodiment, the electronic device 800 may correspond to a kiosk device pre-installed with the discount rewards program application.

It may be noted that the computer program code corresponding to the discount rewards program application installed in the electronic device 800 may not only be configured to display one or more user interfaces associated with the discount rewards program application, but also cause the electronic device to perform various functionalities associated with administering the discount rewards programs, such as for example, facilitating enrollment of a customer of a merchant establishment into a discount rewards program, the customer engaged in a purchase transaction at the merchant establishment; discounting a bill amount associated with the purchase transaction based on a discount level assigned to the customer as a part of the customer enrollment into the discount rewards program, the discount level being one of a plurality of discount levels associated with the discount rewards program, wherein each discount level from the plurality of discount levels is associated with a respective predefined discount factor, and wherein the predefined discount factor is configured to increase with increase in discount level up to a maximum discount level from among the plurality of discount levels; for a next purchase transaction at the merchant establishment, determining if the next purchase transaction is within a predefined time interval from the purchase transaction associated with the customer enrollment; determining processor, a current discount level for the next purchase transaction by (1) incrementing the discount level to a next discount level from among the plurality of discount levels if the next purchase transaction is within the predefined time interval, wherein the discount level is retained if the discount level is at the maximum discount level, or (2) decrementing the discount level to a lower discount level from among the plurality of discount levels if the next purchase transaction is beyond the predefined time interval, wherein the discount level is retained if the discount level is at a minimum discount level; and discounting a bill amount associated with the next purchase transaction based on the current discount level, wherein the discounted bill amount is provided to the customer to reward the customer. The administering of the discount rewards programs for customers of the merchant may be performed by the electronic device 800 as explained with reference to FIGS. 2 to 5 and is not explained again herein.

The illustrated electronic device 800 includes a controller or a processor 802 (e.g., a signal processor, microprocessor, ASIC, or other control and processing logic circuitry) for performing tasks such as signal coding, data processing, image processing, input/output processing, power control, and/or other functions. An operating system 804 controls the allocation and usage of the components of the electronic device 800 and support for one or more applications programs (see, applications 806), such as the discount rewards program application that implements one or more of the innovative features described herein. In addition to the discount rewards program application, the applications 806 may include common mobile computing applications (e.g., telephony applications, email applications, calendars, contact managers, web browsers, messaging applications) or any other computing application.

The illustrated electronic device 800 includes one or more memory components, for example, a non-removable memory 808 and/or removable memory 810. The non-removable memory 808 can include RAM, ROM, flash memory, a hard disk, or other well-known memory storage technologies. The removable memory 810 can include flash memory, smart cards, or a Subscriber Identity Module (SIM). The one or more memory components can be used for storing data and/or code for running the operating system 804 and the applications 806. Examples of data can include web pages, text, images, sound files, image data, video data, or other data sets to be sent to and/or received from one or more network servers or other devices via one or more wired or wireless networks. The electronic device 800 may further include a user identity module (UIM) 812. The UIM 812 may be a memory device having a processor built in. The UIM 812 may include, for example, a SIM, a universal integrated circuit card (UICC), a universal subscriber identity module (USIM), a removable user identity module (R-UIM), or any other smart card. The UIM 812 typically stores information elements related to a mobile subscriber. The UIM 812 in form of the SIM card is well known in Global System for Mobile Communications (GSM) communication systems, Code Division Multiple Access (CDMA) systems, or with third-generation (3G) wireless communication protocols such as Universal Mobile Telecommunications System (UMTS), CDMA9000, wideband CDMA (WCDMA) and time division-synchronous CDMA (TD-SCDMA).

The electronic device 800 can support one or more input devices 820 and one or more output devices 830. Examples of the input devices 820 may include, but are not limited to, a touch screen 822 (e.g., capable of capturing finger tap inputs, finger gesture inputs, multi-finger tap inputs, multi-finger gesture inputs, or keystroke inputs from a virtual keyboard or keypad), a microphone 824 (e.g., capable of capturing voice input), a camera module 826 (e.g., capable of capturing still picture images and/or video image frames) and a physical keyboard 828. Examples of the output devices 830 may include, but are not limited to a speaker 832 and a display 834. Other possible output devices (not shown) can include piezoelectric or other haptic output devices.

Some devices can serve more than one input/output function. For example, the touch screen 822 and the display 834 can be combined into a single input/output device.

In an embodiment, the camera module 826 may include a digital camera capable of facilitating image/video capture. In some implementations, the camera module 826 may include two or more cameras, for example, a front camera and a rear camera positioned on two sides of the electronic device 800. As such, the camera module 826 includes all hardware, such as a lens or other optical component(s), and software for capturing images and/or creating a video stream from a captured video. Alternatively, the camera module 826 may include the hardware needed to view the video, while a memory device of the electronic device 800 stores instructions for execution by the processor 802 in the form of software to create a video stream from a captured video. In an example embodiment, the camera module 826 may further include a processing element such as a co-processor, which assists the processor 802 in processing image frame data and an encoder and/or decoder for compressing and/or decompressing image data. In an embodiment, the camera module 826 may provide live image data (viewfinder image data) to the display 834.

A wireless modem 840 can be coupled to one or more antennas (not shown in FIG. 8) and can support two-way communications between the processor 802 and external devices, as is well known in the art. The wireless modem 840 is shown generically and can include, for example, a cellular modem 842 for communicating at long range with the mobile communication network, a Wi-Fi-compatible modem 844 for communicating at short range with an external Bluetooth-equipped device or a local wireless data network or router, and/or a Bluetooth-compatible modem 846. The wireless modem 840 is typically configured for communication with one or more cellular networks, such as a GSM network for data and voice communications within a single cellular network, between cellular networks, or between the mobile device and a public switched telephone network (PSTN).

The electronic device 800 can further include one or more input/output ports 850, a power supply 852, one or more sensors 854 for example, an accelerometer, a gyroscope, a compass, or an infrared proximity sensor for detecting the orientation or motion of the electronic device 800, a transceiver 856 (for wirelessly transmitting analog or digital signals) and/or a physical connector 860, which can be a USB port, IEEE 1394 (FireWire) port, and/or RS-232 port. The illustrated components are not required or all-inclusive, as any of the components shown can be deleted and other components can be added.

As explained above, in some embodiments, a system, such as the system 200 capable of facilitating an administering of the discount rewards program may be embodied within the merchant terminal. However, in some embodiments, the discount rewards program may be administered by the remote server capable of administering such a program via merchant terminals deployed at a plurality of merchant establishments. An example remote server facilitating an administering of the discount rewards program is explained with reference to FIG. 9.

Figure 9:
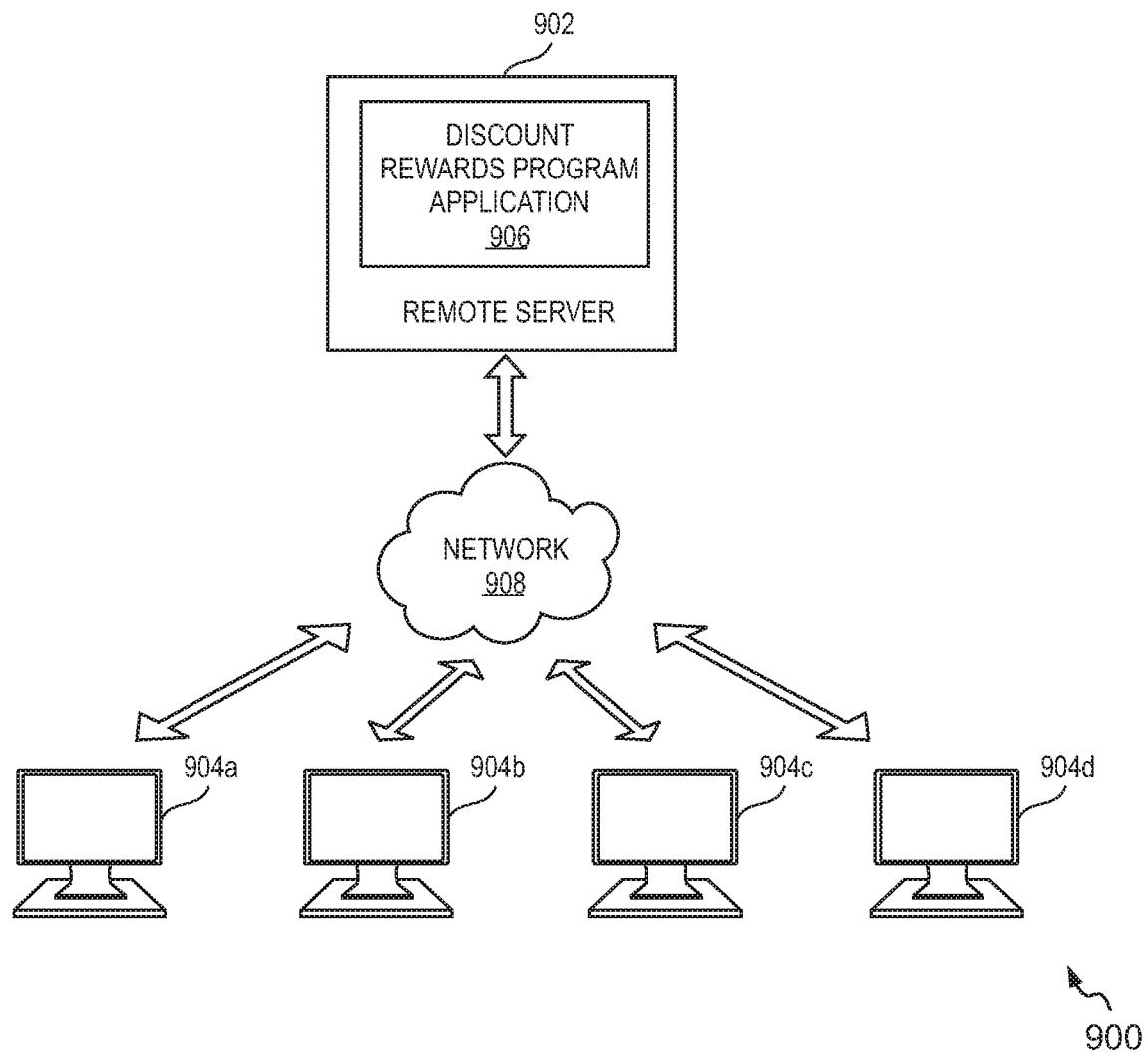
FIG. 9 illustrates a remote server configured to facilitate administering of a discount rewards program via a merchant terminal of a merchant establishment, in accordance with an example embodiment.

Referring now to FIG. 9, an example representation 900 showing a remote server 902 in communication with a plurality of merchant terminals 904*a-d* for administering the discount rewards program is depicted in accordance with an example embodiment. The remote server 902 is depicted to host the discount rewards program application 906. The discount rewards program application 906 may be associated with various UIs, such as the UIs 300, 400 and 500 explained with reference to FIGS. 3, 4A-4C and 5. A plurality of client devices, such as merchant terminals 904*a-d*, may access and download instances of discount rewards program application 906 hosted by the remote server 902 over various types of communication networks, exemplarily depicted as network 908 in FIG. 9. Some examples of the network 908 may include wired networks, wireless networks or any combination thereof (such as for example, the Internet). In one embodiment, the remote server 902 may be a cloud-based service, offering subscription based discount rewards program application to the plurality of merchant terminals 904*a-d* over a cloud-based network.

The remote server 902 may include at least a processor and a database (not shown in FIG. 9). The processor and the database may be configured to perform the various functionalities of the processor 202 and the memory 204 as explained with reference to FIGS. 2 to 5, respectively, and are not explained again herein. More specifically, the processor may be configured to execute the discount rewards program application stored in the database via the merchant terminals 904*a-d* to facilitate administering the discount rewards program to the customers. The database may store data of customers enrolled into the discount rewards program.

It is noted that each merchant terminal may include a display module, such as the display module 212 explained with reference to FIG. 2, to facilitate provisioning of an output and/or receiving of an input from respective users of the merchant terminals 904*a-d*. Further, each merchant terminal may include a communication interface, such as the communication interface 208 explained with reference to FIG. 2, to communicate with the remote server 902. In an embodiment, the merchant terminals 904*a-d* may access the discount rewards program application on the remote server 902 through a user interface, such as a web browser and the various UIs, such as the UIs 300, 400 and 500, may correspond to web-based UIs accessible from the remote server 902.

The discount rewards program may be administered by the remote server 902 via the merchant terminals 904*a-d* to a plurality of customers that may approach the merchant terminals 904*a-d* for processing purchase transactions. The administering of the discount rewards program is explained hereinafter with reference to one customer approaching a merchant establishment that houses a merchant terminal such as the merchant terminal 904*a*. However, it is understood that the remote server 902 may be caused to facilitate administering of the discount rewards program to the plurality of customers of several merchant establishments in a similar manner.

In at least one example embodiment, the remote server 902 may facilitate enrollment of the customer of the merchant establishment into the discount rewards program. In an illustrative example, the customer having chosen a product to be purchased, or a service to be availed, from the merchant establishment may visit the merchant terminal 904*a* to complete the purchase transaction. A user of the merchant terminal 904*a* (for example, a representative, an agent or a merchant of the merchant establishment) may request the customer to enroll into the discount rewards program prior to completing the purchase transaction. In at least one example embodiment, the user may explain the benefits of enrolling into the discount rewards program to the customer. If the customer agrees to enroll, the user may provide an input related to accessing of the discount rewards program application installed in the merchant terminal 904*a*.

Upon reception of such an input, the remote server 902 may be caused to display a first user interface such as the first user interface (UI) 300 on the display module of the merchant terminal 904*a* to facilitate enrollment of the customer in the discount rewards program. On receiving the information entered in the form fields 304-314 (as shown in FIG. 3) the customer may be enrolled into the discount rewards program. The information related to the customer enrollment may be stored in the database of the remote server 902.

Upon enrollment of the customer into the discount rewards program, the remote server 902 may assign a discount level to the customer. Further, the processor of the remote server 902 may cause to discount a bill amount for an ongoing purchase transaction at the time of enrollment based on the discount level assigned to the customer. The discount level assigned to the customer at the time of customer enrollment may be one of a plurality of discount levels associated with the discount rewards program. Each discount level from the plurality of discount levels may be associated with a respective predefined discount factor, as explained with reference to FIG. 2. Further, the predefined discount factor associated with various discount levels may be configured to increase with increase in the discount level up to a maximum discount level. More specifically, a quantum of discount provided to the customer may be configured to increase with increase in discount level up to a maximum discount level. In an embodiment, the increase in the predefined discount factor may be in accordance with a discount factor interval, set by the user of the merchant terminal 904*a* or suggested by the processor of the remote server 902 and selected by the user.

In at least one example embodiment, for a next transaction by the customer at the merchant establishment, for example a second purchase transaction, the remote server 902 may be caused to determine if the second purchase transaction from the time of customer enrollment is within a predefined time interval from the first purchase transaction executed at the time of customer enrollment. If the second purchase transaction is within the predefined time interval, the remote server 902 may be caused to determine a current discount level for the second purchase transaction by incrementing the discount level to a next discount level. In some embodiments, the discount level associated with the customer may be at a maximum discount level. In such a case, even if the customer makes a repeat purchase transaction within the predefined time interval, the discount level may not be further incremented but retained at the maximum discount level.

In some embodiments, if the next purchase transaction, for example the second purchase transaction, is executed subsequent to completion of the predefined time interval, the remote server 902 may be caused to decrement the discount level to a lower discount level from among the plurality of discount levels associated with the discount rewards program. The predefined time interval may be reinitialized or reset on lapse of the predefined time interval. In an example embodiment, the discount level may be decremented a number of times proportionate to the number of times the predefined time interval lapses until a minimum discount level is reached. The predefined time interval may be reinitialized upon completion of the next purchase transaction. The remote server 902 may apply a predefined discount factor associated with the decremented discount level to the bill amount associated with the next or the second purchase transaction.

In an example embodiment, if a next purchase transaction is executed beyond the predefined time interval but within the subsequent lapse of the reinitialized predefined time interval, the discount level may be decremented to a previous discount level, as the predefined time interval has lapsed by one time interval duration. Accordingly, the remote server 902 may be caused to determine the current discount level as the previous discount level and apply a predefined discount factor associated with the previous discount level to the bill amount associated with the next purchase transaction. It is noted that the predefined time interval may be reinitialized upon completion of the next purchase transaction. In an example embodiment if the discount level is at a minimum discount level, and the next purchase transaction occurs beyond the predefined time interval the processor may retain the discount level at the minimum discount level. As a result, the remote server 902 maintains provisioning of a minimum discount corresponding to the minimum discount level to the customer for each purchase transaction.

The process explained above may be repeated for each purchase transaction, such that the discount level is incremented if the customer makes a repeat purchase transaction within the predefined time interval up to a maximum discount level, and the discount level is decremented every time the customer misses a purchase transaction within the predefined time interval. For any given purchase transaction, the remote server 902 may be caused to determine a current discount level and apply a predefined discount factor as per the current discount level to the billed amount. The discounted bill amount may be provided to the customer to reward the customer. Further, the remote server 902 may reinitialize, the predefined time interval subsequent to completion of a purchase transaction or on expiry of the predefined time interval.

In order to facilitate a provisioning of values corresponding to the discount levels, discount factor interval and the predefined time interval, another web-based UI such as a second UI 400 (as shown in FIGS. 4A to 4C) may be displayed to the user on the display module of the merchant terminal 904*a* to receive appropriate input from the user. The user may provide the input by providing values to the fields 420-424 (as shown in FIG. 4) for setting the predefined time interval, the discount factor interval and the maximum number of discount levels for the discount rewards program to be administered to the customer. The remote server 902 may administer the discount rewards program based on the input received from the merchant terminal 904*a* via the communication interface of the merchant terminal 904*a*.

As explained above, the remote server 902 may provide at least one suggestion corresponding to the input such that the suggestion(s) may comprise respective predetermined optimum values for the predefined time interval, the discount factor interval, and the maximum number of discount levels based on an industry corresponding to the merchant establishment. Industry standard settings for predefined time interval, the discount factor interval, and the maximum number of discount levels may be preset (for example, as default values) to achieve a high loyalty attachment from the customer towards the merchant establishment. The suggestion(s) may be communicated from the remote server 902 to the merchant terminal 904*a* via the network 908. Accordingly, optimum values based on industry research may be set as default values for each of these parameters, which may serve as suggestions to the merchant. The user of the merchant terminal 904*a* may choose to retain the default values or change the values to provision a chosen input.

Further, in at least one example embodiment, an availability of discount (i.e. the predefined discount factor corresponding to the next discount level) for a time period corresponding to the predefined time interval may be communicated to the customer by one or more reminder notifications. The one or more reminder notifications may include date reminders to remind the customer of the discount to be availed for the next purchase at the merchant establishment and a time left for the offered discount to lapse. The reminder notifications may be sent to the customer to compel the customer to make the next purchase transaction before expiry of the predefined time interval. A number of the reminder notifications to be communicated to the customer may be determined based on an input provided by the user via another web-based UI such as the third UI 500 explained with reference to FIG. 5. Such a UI may be displayed on the display module of the merchant terminal 904*a* to receive the user input. As a part of the user input, the user may provide a numerical value to the input (such as the input 514 explained in FIG. 5) corresponding to a number of reminder notifications to be provided to the customer during the predefined time interval. The remote server 902 may receive the input via a communication interface and provide the one or more reminder notifications to the customer based on the user input.

Further, the remote server 902 may provide at least one suggestion corresponding to the second input such that the at least one suggestion may include respective predefined optimum input value for an industry corresponding to the merchant establishment. For example, the number of reminder notifications may be optimized based on the at least one suggestion in order to achieve higher efficiency in the discount rewards program for the merchant.

Various embodiments of the present technology provide a method, system and computer program product that are capable of overcoming these and other obstacles and providing additional benefits. A time-based loyalty program, in form of a discount rewards program, is disclosed that uses an increasing and decreasing discount reward schedule based on regular interval visits made or missed, respectively, to compel customers to repeat purchases with the same merchant within set time intervals. More specifically, the discount rewards program is designed to reward a customer more if the visit is sooner and less if the visit is later. Since rewards are given for each visit, the discount rewards program overcomes the common issue of reward points taking too long to earn, on repeat-based items. The discount rewards program also avoids the payment penalty for non-use issue that memberships have. Furthermore, the discount rewards program can achieve the retention of daily deal customers by offering their next visit within the time interval set at the same discount level as they received with the daily deal. This overcomes the problem with daily deal clients not returning at full price to earn future rewards by issuing the same reward immediately.

It is noted that various example embodiments as described herein may be implemented in a wide variety of devices, network configurations and applications.

Computer executable instructions may be provided using any computer-readable media that is accessible by computing based device. Computer-readable media may include, for example, computer storage media such as memory and communications media. Computer storage media, such as memory, includes volatile and non-volatile, removable and non-removable media implemented in any method or technology for storage of information such as computer readable instructions, data structures, program modules or the like. Computer storage media includes, but is not limited to, RAM, ROM, EPROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that may be used to store information for access by a computing device. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Although the computer storage media is shown within the computing-based device it will be appreciated that the storage may be distributed or located remotely and accessed via a network or other communication link, for example by using communication interface.

The methods described herein may be performed by software in machine readable form on a tangible storage medium e.g. in the form of a computer program comprising computer program code means adapted to perform all the operations of any of the methods described herein when the program is run on a computer and where the computer program may be embodied on a computer readable medium. Examples of tangible storage media include computer storage devices such as disks, thumb drives, memory etc. The software can be suitable for execution on a parallel processor or a serial processor such that the method operations may be carried out in any suitable order, or simultaneously.

Alternatively, or in addition, the functionality described herein (such as the discount rewards program instructions) can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), Graphics Processing Units (GPUs). For example, some or all of the device functionality or method sequences may be performed by one or more hardware logic components.

The embodiments illustrated and described herein as well as embodiments not specifically described herein but within the scope of aspects of the invention constitute exemplary system means for administering the discount rewards programs.

The benefits and advantages described above may relate to one embodiment or may relate to several embodiments. The embodiments are not limited to those that solve any or all of the stated problems or those that have any or all of the stated benefits and advantages.

The operations of the methods described herein may be carried out in any suitable order, or simultaneously where appropriate. Additionally, individual blocks may be added or deleted from any of the methods without departing from the spirit and scope of the subject matter described herein. Aspects of any of the examples described above may be combined with aspects of any of the other examples described to form further examples without losing the effect sought.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A computer-implemented method comprising:

executing by a processor, enrollment of a customer of a merchant establishment into a discount rewards program, the customer engaged in a purchase transaction at the merchant establishment, wherein the enrollment of the customer comprises:

displaying a plurality of form fields on a user interface of a user device associated with the customer for providing customer details, wherein the customer details comprise purchase preferences of the customer; and storing the customer details of the customer enrolled into the discount rewards program in a database;

displaying, by the processor, a plurality of input fields on a user interface for a first input related to at least one of a predefined time interval, a discount factor interval corresponding to an interval between predefined discount factors associated with a plurality of discount levels, and a maximum number of discount levels, the first input provided by a representative associated with the merchant establishment through the user interface;

displaying, by the processor, at least one suggestion corresponding to optimum input values of the first input on the user interface, wherein the optimum input values associated with the predefined time interval, the discount factor interval, and the maximum number of discount levels are determined by the processor based at least on a type of products and services offered by the merchant establishment, and industry standards associated with the merchant establishment;

computing, by the processor, a bill amount associated with the purchase transaction based on a discount level assigned to the customer as a part of the customer enrollment into the discount rewards program, the discount level being one of the plurality of discount levels associated with the discount rewards program, wherein each discount level from the plurality of discount levels is associated with a respective predefined discount factor, and wherein the predefined discount factor is configured to increase with increase in discount level up to a maximum discount level from among the plurality of discount levels;

for a next purchase transaction at the merchant establishment, determining, by the processor, if the next purchase transaction is within a predefined time interval from the purchase transaction associated with the customer enrollment;

determining, by the processor, a current discount level for the next purchase transaction by:

incrementing the discount level to a next discount level from among the plurality of discount levels if the next purchase transaction is within the predefined time interval, wherein the discount level is retained if the discount level is at the maximum discount level, or the discount level to a lower discount level from among the plurality of discount levels if the next purchase transaction is beyond the predefined time interval, wherein the discount level is retained if the discount level is at a minimum discount level which is equal to the discount level assigned to the customer as part of the customer enrollment, wherein the discount level is decremented a number of times proportionate to a number of times the predefined time interval lapses until the minimum discount level is reached; and computing, by the processor, a bill amount associated with the next purchase transaction based on the current discount level, wherein the discounted bill amount is provided to the customer to reward the customer.

2. The method of claim 1, further comprising:

reinitializing, by the processor, the predefined time interval subsequent to completion of the next purchase transaction.

3. The method of claim 2, further comprising repeating, by the processor, for each subsequent purchase transaction at the merchant establishment, steps of:

determining if a subsequent purchase transaction is within a predefined time interval from a previous purchase transaction;

determining a current discount level based on determination of whether the subsequent purchase transaction is within a predefined time interval from the previous purchase transaction;

computing a bill amount associated with the subsequent purchase transaction based on the current discount level, wherein the discounted bill amount is provided to the customer; and reinitializing the predefined time interval subsequent to completion of the subsequent purchase transaction.

4. The method of claim 1, further comprising:

displaying by the processor, a plurality of input fields on a user interface for a second input related to a number of reminder notifications, each reminder notification configured to remind the customer of a discount to be availed for a next purchase at the merchant establishment and a time left for the predefined time interval to lapse, the second input provided by the representative; and providing, by the processor, one or more reminder notifications to the customer based on the second input.

5. The method of claim 4, further comprising:

displaying, by the processor, at least one suggestion corresponding to the second input on the user interface, the at least one suggestion comprising respective predetermined optimum input values for an industry corresponding to the merchant establishment.

6. The method of claim 1, wherein the current discount level is capable of being retained for one or more future purchase transactions based on predefined criterion.

7. The method of claim 3, wherein the discount level assigned to the customer as part of the customer enrollment is proportionate to a discount coupon provided by the customer during the purchase transaction.

8. The method of claim 1, wherein the predefined time interval is reinitialized after the lapse of the predefined time interval.

9. The method of claim 8, wherein the discount level is decremented to a previous discount level if the next purchase transaction is beyond the predefined time interval but within the subsequent lapse of the reinitialized predefined time interval.

10. The method of claim 8, wherein the discount level is decremented a number of times proportionate to a number of times the predefined time interval lapses until the minimum discount level is reached.

11. The method of claim 1, wherein the discount level is further incremented from the next discount level to a higher discount level if a customer referral enrolls with the discount rewards program.

12. The method of claim 1, wherein the merchant establishment is one of a physical store and an online portal.

13. The method of claim 1, wherein the merchant establishment corresponds to a service provider.

14. A system comprising:
a display module configured to:
display a first UI for enrollment of a customer of a merchant establishment into a discount rewards program, the customer engaged in a purchase transaction at the merchant establishment, wherein the enrollment of the customer comprises:
displaying a plurality of form fields on a user interface of a user device associated with the customer for providing customer details, wherein the customer details comprise purchase preferences of the customer; and
storing the customer details of the customer enrolled into the discount rewards program in a database;
display a second UI for displaying a plurality of input fields on a user interface for a first input related to at least one of a predefined time interval, a discount factor interval corresponding to an interval between predefined discount factors associated with a plurality of discount levels, and a maximum number of discount levels, the first input provided by a representative associated with the merchant establishment;
at least one processor; and
a memory having stored therein machine executable instructions, that when executed by the at least one processor, cause the system to:
display at least one suggestion corresponding to optimum input values of the first input on the second UI, wherein the optimum input values associated with the predefined time interval, the discount factor interval, and the maximum number of discount levels are determined based at least on a type of products and services offered by the merchant establishment, and industry standards associated with the merchant establishment;
compute a bill amount associated with the purchase transaction based on a discount level assigned to the customer as a part of the customer enrollment into the discount rewards program, the discount level being one of the plurality of discount levels associated with the discount rewards program, wherein each discount level from the plurality of discount levels is associated with a respective predefined discount factor, and wherein the predefined discount factor is configured to increase with increase in the discount level up to a maximum discount level from among the plurality of discount levels;
for a next purchase transaction at the merchant establishment, determine if the next purchase transaction is within a predefined time interval from the purchase transaction associated with the customer enrollment;
determine a current discount level for the next purchase transaction by:
incrementing the discount level to a next discount level from among the plurality of discount levels if the next purchase transaction is within the predefined time interval, wherein the discount level is retained if the discount level is at the maximum discount level, or
decrementing the discount level to a lower discount level from among the plurality of discount levels if the next purchase transaction is beyond the predefined time interval, wherein the discount level is retained if the discount level is at a minimum discount level which is equal to the discount level assigned to the customer as part of the customer enrollment, wherein the discount level is decremented a number of times proportionate to a number of times the predefined time interval lapses until the minimum discount level is reached; and
compute a bill amount associated with the next purchase transaction based on the current discount level, wherein the discounted bill amount is provided to the customer to reward the customer.

15. The system of claim 14, wherein the system is further caused, at least in part, to:
reinitialize the predefined time interval subsequent to completion of the next purchase transaction.

16. The system of claim 15, wherein the system is further caused, at least in part, to repeat for each subsequent purchase transaction at the merchant establishment, steps of:
determining if a subsequent purchase transaction is within a predefined time interval from a previous purchase transaction;
determining a current discount level based on determination of whether the subsequent purchase transaction is within a predefined time interval from the previous purchase transaction;
computing a bill amount associated with the subsequent purchase transaction based on the current discount level, wherein the discounted bill amount is provided to the customer; and
reinitializing the predefined time interval subsequent to completion of the subsequent purchase transaction.

17. The system of claim 14, wherein the display module is further configured to display a third UI for displaying a plurality of input fields on a user interface for a second input related to a number of reminder notifications, each reminder notification configured to remind the customer of a discount to be availed for a next purchase at the merchant establishment and a time left for the predefined time interval to lapse, the second input provided by the representative.

18. The system of claim 17, further comprising:
a communication interface configured to provide one or more reminder notifications to the customer based on the second input.

19. The system of claim 17, wherein the system is further caused, at least in part to:
display at least one suggestion corresponding to the second input on the user interface, the at least one suggestion comprising respective predetermined optimum input values for an industry corresponding to the merchant establishment.

20. The system of claim 14, wherein the current discount level is capable of being retained for one or more future purchase transactions based on predefined criterion.

21. The system of claim 16, wherein the discount level assigned to the customer as part of the customer enrollment is a discount level proportionate to a discount coupon provided by the customer during the purchase transaction.

22. The system of claim 16, wherein the predefined time interval is reinitialized after the lapse of the predefined time interval, and wherein the discount level is decremented to a previous discount level if the next purchase transaction is beyond the predefined time interval but within the subsequent lapse of the reinitialized predefined time interval.

23. The system of claim 22, wherein the discount level is decremented a number of times proportionate to a number of times the predefined time interval lapses until the minimum discount level is reached.

24. The system of claim 14, wherein the discount level is further incremented from the next discount level to a higher discount level if a customer referral enrolls with the discount rewards program.

25. A computer program product comprising at least one computer-readable storage medium, the computer-readable storage medium comprising a set of instructions, which, when executed by one or more processors, cause an electronic device to at least perform:
- display a first UI for enrollment of a customer of a merchant establishment into a discount rewards program, the customer engaged in a purchase transaction at the merchant establishment, wherein the enrollment of the customer further comprises:
  - displaying a plurality of form fields on a user interface of a user device associated with the customer for providing customer details, wherein the customer details comprise purchase preferences of the customer; and
  - storing the customer details of the customer enrolled into the discount rewards program in a database;
- display a second UI for displaying a plurality of input fields on a user interface for a first input related to at least one of a predefined time interval, a discount factor interval corresponding to an interval between predefined discount factors associated with a plurality of discount levels, and a maximum number of discount levels, the first input provided by a representative associated with the merchant establishment;
- display at least one suggestion corresponding to optimum input values of the first input on the second UI, wherein the optimum input values associated with the predefined time interval, the discount factor interval, and the maximum number of discount levels are determined based at least on a type of products and services offered by the merchant establishment, and industry standards associated with the merchant establishment;
- compute a bill amount associated with the purchase transaction based on a discount level assigned to the customer as a part of the customer enrollment into the discount rewards program, the discount level being one of the plurality of discount levels associated with the discount rewards program, wherein each discount level from the plurality of discount levels is associated with a respective predefined discount factor, and wherein the predefined discount factor is configured to increase with increase in discount level up to a maximum discount level from among the plurality of discount levels;
- for a next purchase transaction at the merchant establishment, determine if the next purchase transaction is within a predefined time interval from the purchase transaction associated with the customer enrollment;
- determine a current discount level for the next purchase transaction by:
  - incrementing the discount level to a next discount level from among the plurality of discount levels if the next purchase transaction is within the predefined time interval, wherein the discount level is retained if the discount level is at the maximum discount level, or
  - decrementing the discount level to a lower discount level from among the plurality of discount levels if the next purchase transaction is beyond the predefined time interval, wherein the discount level is retained if the discount level is at a minimum discount level which is equal to the discount level assigned to the customer as part of the customer enrollment, wherein the discount level is decremented a number of times proportionate to a number of times the predefined time interval lapses until the minimum discount level is reached; and
- compute a bill amount associated with the next purchase transaction based on the current discount level, wherein the discounted bill amount is provided to the customer to reward the customer.

26. The computer program product of claim 25, wherein the electronic device is further caused, at least in part to:
- reinitialize the predefined time interval subsequent to completion of the next purchase transaction.

27. The computer program product of claim 26, wherein the electronic device is further caused, at least in part to repeat for each subsequent purchase transaction at the merchant establishment, steps of:
- determining if a subsequent purchase transaction is within a predefined time interval from a previous purchase transaction;
- determining a current discount level based on determination of whether the subsequent purchase transaction is within a predefined time interval from the previous purchase transaction;
- computing a bill amount associated with the subsequent purchase transaction based on the current discount level, wherein the discounted bill amount is provided to the customer; and
- reinitializing the predefined time interval subsequent to completion of the subsequent purchase transaction.

28. The computer program product of claim 25, wherein the electronic device is further caused, at least in part to:
- display a third UI for displaying a plurality of input fields on a user interface for a second input related to a number of reminder notifications, each reminder notification configured to remind the customer of a discount to be availed for a next purchase at the merchant establishment and a time left for the predefined time interval to lapse, the second input provided by the representative.

* * * * *